US008595046B1

(12) United States Patent  (10) Patent No.: US 8,595,046 B1
Christian                      (45) Date of Patent:     Nov. 26, 2013

(54) SYSTEM AND METHOD FOR INTERACTIVE COORDINATION OF SCHEDULING, CALENDARING, AND MARKETING

(76) Inventor: Jennifer Christian, Orange, CA (US)

( * ) Notice: Subject to any disclaimer, the term of this patent is extended or adjusted under 35 U.S.C. 154(b) by 2868 days.

(21) Appl. No.: 11/107,333

(22) Filed: Apr. 16, 2005

(51) Int. Cl.
    *G06Q 10/00* (2012.01)
(52) U.S. Cl.
    USPC .................................................... 705/7.18
(58) Field of Classification Search
    None
    See application file for complete search history.

(56) References Cited

U.S. PATENT DOCUMENTS

| | | | |
|---|---|---|---|
| 6,918,055 B2* | 7/2005 | Williams | 714/27 |
| 7,305,465 B2* | 12/2007 | Wing et al. | 709/223 |
| 7,359,864 B2* | 4/2008 | Carlson et al. | 705/7.25 |
| 8,346,588 B2* | 1/2013 | Baumer et al. | 705/7.14 |
| 2002/0069119 A1* | 6/2002 | Rogatinsky | 705/26 |
| 2002/0107716 A1* | 8/2002 | Callahan et al. | 705/9 |
| 2003/0061087 A1* | 3/2003 | Srimuang | 705/8 |
| 2003/0179864 A1* | 9/2003 | Stillman et al. | 379/88.18 |
| 2003/0182394 A1* | 9/2003 | Ryngler et al. | 709/217 |
| 2004/0199412 A1* | 10/2004 | McCauley | 705/7 |
| 2004/0268407 A1* | 12/2004 | Sparrell et al. | 725/116 |
| 2005/0261950 A1* | 11/2005 | McCandliss | 705/9 |
| 2006/0026008 A1* | 2/2006 | Goetz | 705/1 |
| 2006/0116918 A1* | 6/2006 | Flora et al. | 705/8 |
| 2007/0121880 A1* | 5/2007 | Stillman et al. | 379/218.01 |

OTHER PUBLICATIONS

Hall, John, R; "New Service Website Holds Promise for Contractors", Nov. 1999, Air Conditioning, Heating & Refrigeration News; 208, 13; ABI/INFORM Global, p. 1.*
Satran, Dick, "Rocket Scientist tries improving service industry", Oct. 1999, Vancouver Sun, Vancouver, B.C., p. E2, ProQuest I D 08321299.*
PRNewswire, "PointServe Launches Breakthrough On-Line Scheduling Solutions to Dramatically Improve the Reliability of Home and Business-Oriented Service Delivery Regional Rollout to Begin in Salt Lake City on Nov. 1; National Launch Slated for Early 2000", Oct. 1999, p. 1, ProQuest ID 45806204.*
Hickey, Kathleen, "Right Place, Right Time", Nov. 1999, Traffic World, v260, n4, p. 47, Dialog 06791905 57430340.*

* cited by examiner

*Primary Examiner* — Jonathan G Sterrett
(74) *Attorney, Agent, or Firm* — Stout, Uxa, Buyan & Mullins, LLP; Donald E. Stout

(57) ABSTRACT

A method and system for providing an interactive website designed and developed as a centralized system for use by Service Providers and their clients in the coordination of appointment scheduling with options for online marketing in the form of display web pages and automated and custom electronic messages and newsletters. The method and system enable users to access via the Internet the data stored and to view, make, and change appointments for services. By requiring various levels of membership, the method and system allow or limit the access of users to the data stored depending on the type of user. A specific embodiment of the system is described as applied to beauty salons.

34 Claims, 18 Drawing Sheets

REGISTER

200 {
First Name:
Last Name:
Address:
City:
State:
Zip:
Email:

Daytime Phone:
Home Phone:
Cell Phone:

201 {
Birthday:
[Select Month] [Select Day]

Anniversary:
[Select Month] [Select Day]

202 {
Beauty Professional Information
*First Name:
*City:
Salon Name:

*Last Name:
*State:

203 — [Submit]

FIGURE 5

Time Preference

Evening (after 4:30 pm)

Preferred Date

○ First Available
● Specific Date  July  18  2004

Submit

FIGURE 7

| | Sunday 05/16 | | Monday 05/17 | | Tuesday 05/18 | | Wednesday 05/19 | | Thursday 05/20 |
|---|---|---|---|---|---|---|---|---|---|
| 08:00 am | | 08:00 | | 08:00 | | 08:00 | | 08:00 | |
| 08:15 am | | 08:15 | | 08:15 | | 08:15 | | 08:15 | |
| 08:30 am | | 08:30 | | 08:30 | | 08:30 | | 08:30 | |
| 08:45 am | | 08:45 | | 08:45 | | 08:45 | | 08:45 | |
| 09:00 am | | 09:00 | | 09:00 | | 09:00 | | 09:00 | |
| 09:15 am | | 09:15 | | 09:15 | | 09:15 | | 09:15 | |
| 09:30 am | | 09:30 | | 09:30 | | 09:30 | | 09:30 | |
| 09:45 am | | 09:45 | | 09:45 | | 09:45 | | 09:45 | |
| 10:00 am | | 10:00 | | 10:00 | | 10:00 | | 10:00 | |
| 10:15 am | | 10:15 | | 10:15 | | 10:15 | | 10:15 | |
| 10:30 am | | 10:30 | | 10:30 | | 10:30 | | 10:30 | |
| 10:45 am | | 10:45 | | 10:45 | | 10:45 | | 10:45 | |
| 11:00 am | | 11:00 | | 11:00 | | 11:00 | | 11:00 | |
| 11:15 am | | 11:15 | | 11:15 | | 11:15 | | 11:15 | |
| 11:30 am | | 11:30 | | 11:30 | | 11:30 | | 11:30 | |
| 11:45 am | | 11:45 | | 11:45 | | 11:45 | | 11:45 | |
| 12:00 pm | | 12:00 | | 12:00 | | 12:00 | | 12:00 | |
| 12:15 pm | | 12:15 | | 12:15 | | 12:15 | | 12:15 | |
| 12:30 pm | | 12:30 | | 12:30 | | 12:30 | | 12:30 | |
| 12:45 pm | | 12:45 | | 12:45 | | 12:45 | | 12:45 | |
| 01:00 pm | | 01:00 | | 01:00 | | 01:00 | | 01:00 | |
| 01:15 pm | | 01:15 | | 01:15 | | 01:15 | | 01:15 | |
| 01:30 pm | | 01:30 | | 01:30 | | 01:30 | | 01:30 | |
| 01:45 pm | | 01:45 | | 01:45 | | 01:45 | | 01:45 | |
| 02:00 pm | | 02:00 | | 02:00 | | 02:00 | | 02:00 | |
| 02:15 pm | | 02:15 | | 02:15 | | 02:15 | | 02:15 | |
| 02:30 pm | | 02:30 | | 02:30 | | 02:30 | | 02:30 | |
| 02:45 pm | | 02:45 | | 02:45 | | 02:45 | | 02:45 | |
| 03:00 pm | | 03:00 | | 03:00 | | 03:00 | | 03:00 | |
| 03:15 pm | | 03:15 | | 03:15 | | 03:15 | | 03:15 | |
| 03:30 pm | | 03:30 | | 03:30 | | 03:30 | | 03:30 | |
| 03:45 pm | | 03:45 | | 03:45 | | 03:45 | | 03:45 | |
| 04:00 pm | | 04:00 | | 04:00 | | 04:00 | | 04:00 | |
| 04:15 pm | | 04:15 | | 04:15 | | 04:15 | | 04:15 | |
| 04:30 pm | | 04:30 | | 04:30 | | 04:30 | | 04:30 | |
| 04:45 pm | | 04:45 | | 04:45 | | 04:45 | | 04:45 | |
| 05:00 pm | | 05:00 | | 05:00 | | 05:00 | | 05:00 | |
| 05:15 pm | | 05:15 | | 05:15 | | 05:15 | | 05:15 | |
| 05:30 pm | | 05:30 | | 05:30 | | 05:30 | | 05:30 | |
| 05:45 pm | | 05:45 | | 05:45 | | 05:45 | | 05:45 | |
| 06:00 pm | | 06:00 | | 06:00 | | 06:00 | | 06:00 | |
| 06:15 pm | | 06:15 | | 06:15 | | 06:15 | | 06:15 | |
| 06:30 pm | | 06:30 | | 06:30 | | 06:30 | | 06:30 | |
| 06:45 pm | | 06:45 | | 06:45 | | 06:45 | | 06:45 | |

Weekly Schedule for 05/16 - 05/22

FIGURE 12

| | | June | | | | |
|---|---|---|---|---|---|---|
| Sunday | Monday | Tuesday | Wednesday | Thursday | Friday | Saturday |
| | | 1 Appt. Available | 2 Appt. Available | 3 Appt. Available | 4 OFF | 5 Booked |
| 6 OFF | 7 Booked | 8 Appt. Available | 9 Appt. Available | 10 Appt. Available | 11 OFF | 12 OFF |
| 13 OFF | 14 Appt. Available | 15 Appt. Available | 16 Appt. Available | 17 Appt. Available | 18 OFF | 19 OFF |
| 20 Booked | 21 Appt. Available | 22 Appt. Available | 23 Appt. Available | 24 Appt. Available | 25 Booked | 26 OFF |
| 27 OFF | 28 Appt. Available | 29 Appt. Available | 30 Appt. Available | | | |

June 2004
| S | M | T | W | T | F | S |
|---|---|---|---|---|---|---|
| | | 1 | [2] | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | | | |

July 2004
| S | M | T | W | T | F | S |
|---|---|---|---|---|---|---|
| | | | | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

August 2004
| S | M | T | W | T | F | S |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |

September 2004
| S | M | T | W | T | F | S |
|---|---|---|---|---|---|---|
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | | |

FIGURE 13

Client Record for Jennifer Christian, Orange, CA

Teri Watson  Daytime Phone: 222.222.2222
1234 Main St.  Home Phone: 333.333.3333
Orange, CA  Cell Phone: 444.444.4444 teri@mdalink.com

Birthday: 8/24  Anniversary: N/A

Teri has the following appointments scheduled:

- Womens Haircut, June 02, 2004 10:30 am

Haircolor Formula:
6N - 30 vol. Process 40 min. 7N - 20 vol. Process 30 min.

Permanent Wave Formula:
7th Dimension, Process 15 min., Neutralize 7 min. White and Purple Rods

Make-Up:
Green Perfection Creme, Natural Beige foundation

Hair Styling:
Hair rolled on medium rollers under dryer. Up do took approx. 25 min.

Notes:

FIGURE 14

First Name:

Last Name:

Address:

City:

State:

Zip:

Email:

Birthday:
[Select Month ▼] [Select Day ▼]

Daytime Phone:

Home Phone:

Cell Phone:

Anniversary:
[Select Month ▼] [Select Day ▼]

Haircolor Formula:

Permanent Wave Formula:

Make-Up:

Hair Styling:

Notes:

[Submit]

FIGURE 15

MY WEEKLY SCHEDULE

| | | |
|---|---|---|
| Sunday | Day Off | |
| Monday | Hours: 8:00 am-6:00 pm | Edit |
| Tuesday | Hours: 9:00 am-7:00 pm<br>Break: 1:00 am-2:00 am | Edit |
| Wednesday | Hours: 9:00 am-5:00 pm<br>Break: 1:00 am-1:45 am | Edit |
| Thursday | Hours: 8:00 am-5:00 pm<br>Break: 8:00 am-8:15 am | Edit |
| Friday | Day Off | |
| Saturday | Day Off | |

FIGURE 16

Schedule for Monday

Day Off: ☐

Start Time: [ 9:00 am  ⇕ ]

End Time: [ 5:00 pm  ⇕ ]

Do you take a scheduled break? ◉ Yes ○ No

If you take a break, Break Start Time: [ 11:00 am ⇕ ]

Length of break: [ 1 hr  ⇕ ]

[ Submit ]

FIGURE 17

EDIT APPOINTMENTS

401 { Search by name
First Name: [_____] [Search]  Last Name: [_____] [Search]

402 { Search by last Initial
A B C D E F G H I J K L M N O P Q R S T U V W X Y Z << Search by date >>

| June 2004 | July 2004 | August 2004 | September 2004 |
|---|---|---|---|
| S M T W T F S | S M T W T F S | S M T W T F S | S M T W T F S |
|     1 2 3 4 5 |           1 2 3 | 1 2 3 4 5 6 7 |         1 2 3 4 |
| 6 7 8 9 10 11 12 | 4 5 6 7 8 9 10 | 8 9 10 11 12 13 14 | 5 6 7 8 9 10 11 |
| 13 14 15 16 17 18 19 | 11 12 13 14 15 16 17 | 15 16 17 18 19 20 21 | 12 13 14 15 16 17 18 |
| 20 21 22 23 24 25 26 | 18 19 20 21 22 23 24 | 22 23 24 25 26 27 28 | 19 20 21 22 23 24 25 |
| 27 28 29 30 | 25 26 27 28 29 30 31 | 29 30 31 | 26 27 28 29 30 |

EDIT SERVICE

Service Name: [Perm]

Virtual Salons Category: [Perm ▼]

Service Time

Start: [1 hr ▼]

Skip: [0 min. ▼]

Finish: [0 min. ▼]

Price: [0]

Recommended Frequency: [Frequency ▼]

Information about this service you would like included with the confirmation email for this service:

[                    ]

[Submit]

FIGURE 19

| Start Date: | March 1, 2004 |
|---|---|
| End Date: | June 1, 2004 |
| Total Income: | $60 |
| Commission: | 15 % |
| Commission Due: | $9.00 |

INCOME REPORTS

FIGURE 20

SYSTEM AND METHOD FOR INTERACTIVE COORDINATION OF SCHEDULING, CALENDARING, AND MARKETING

BACKGROUND OF THE INVENTION

1. Field of the Invention

The present invention relates in general to the field of interactive web engine based business coordination services, and more particularly to a system and method for the management and coordination of the time schedules, appointment calendaring, client personal data, marketing of products and services, and income tracking for Individual Service Providers, and for companies that lend, rent, or lease facilities to Individual Service Providers. The invention involves a centralized, web engine based system that enables providers of goods and services to create customized time and appointment schedules and marketing presentations and communications. It also allows a Consumer of an individual Service Provider access to that Individual Service Provider's marketing presentations, goods and service listings, price listings, and appointment calendaring, and to submit, personal data into the system.

For purposes of this application, the Applicant uses the term "Individual Service Providers" to refer to individuals who offer business services, including related product sales. The term "Company Service Providers" is used to refer to company organizations that offer business services, including related product sales, and that either hire Individual Service Providers or lend, rent, or lease facilities to them for purposes of providing business services. The term "Service Providers" refers to both individuals and companies when a specific adjective is not otherwise used. The Applicant uses the term "Consumers" to refer to clients or customers of the Service Providers.

The invention also provides for protected access to the system as a means of securing use of the system against unauthorized users. For example, an Individual Service Provider is permitted to use the system in relation to his or her services and Consumers only, and access is prohibited to data related to the services or Consumers of other providers. A Company Service Provider is permitted to view, edit, and make appointments for only those Individual Service Providers who have authorized the company's access, and the Company Service Provider cannot access any of the Consumer data stored in the system. A Consumer of services is permitted to enter and review his or her own personal data stored in the system, make and change appointments, and review marketing information stored for the Consumer's particular Individual Service Provider, but cannot access data stored by other Consumers. In one embodiment of the system, secure access may be established by means of registration and membership procedures.

This system is intended for use by Service Providers and Consumers in any trade or service industry. For ease of illustration, a specific embodiment of the method and system is described as applied to beauty professionals, their clients, and salons.

2. Description of Related Art

Prior art exists in relation to business methods for distribution of data to, or automated communication with, Consumers. U.S. Patent No. 2001-0054004 teaches a business model using proprietary software to distribute branding, advertising, marketing, and service data to the users of the software. U.S. Patent No. 2002-0178078 describes a computerized system and method by which a business may respond to customers using automated communications to deliver correspondence and gifts. These inventions do not function as a centralized system that allows many subscribers to provide their schedules online so customers can make, change, and cancel appointments in a customized schedule form and to create customized web pages, electronic messages, newsletters, and other marketing promotions.

Other prior art exists in the area of online commercial payment and financial investment methods and systems. U.S. Pat. No. 6,405,177 describes a method for securing credit card transactions online. U.S. Pat. No. 6,470,321 teaches a system and method for determining an equity protection insurance policy. U.S. Pat. No. 6,085,176 demonstrates a computerized method for the purchase and resale of goods such that parties can interactively bid on price. These systems and methods do not involve the scheduling of appointments or the marketing of services.

Various prior art exists for systems and methods that allow a user to enter information that the system then evaluates according to predetermined analysis programming to arrive at a result and report for the user. U.S. Pat. No. 6,643,385 teaches a system and method for planning weight-loss goals. Websites for calculation of loan and mortgage rates are common, as are websites for determining currency exchange rates. These systems have no provision for scheduling appointments or for determining the cost-savings of using the system in comparison to other available methods or systems.

Prior art exists for systems and methods by which users can access online services. U.S. Pat. No. 6,711,682 provides a system and method for a user to gain access to an online service by means of an automatically generated identifier when the user fails to provide a required identifier. Such prior art has no provision for appointment scheduling or customized marketing by which Consumers can be contacted to encourage repeat business.

Scheduling and project management systems are available in prior art. U.S. Pat. No. 6,604,124 teaches a system and method for computerized management of work flow and for tracking the completion of projects in a company. Websites for gaming and sports have developed systems for posting schedules of teams and athletes. Such systems do not allow Consumers to schedule appointments with Service Providers, nor do they provide for marketing and promotional features that encourage Consumer return business.

In various industries and businesses, Service Providers need to take reservations and make appointments for Consumers and subsequently confirm and remind Consumers of the appointment time. Often, a Service Provider retains personal data about a Consumer's preferences and the services previously given so the provider can customize its services for that same Consumer should he or she return. To generate repeat business, Service Providers usually need to contact their clients periodically to encourage them to make new appointments for services. This follow-up marketing can be labor, time, and cost intensive because individual communications are needed for each client. In trades and industries that are particularly competitive, ease of access to the provider and quality of customer care by the provider can be the difference between success and failure. For example, in the beauty business, clients typically telephone a beauty salon for an appointment, and a receptionist logs the reservation for all stylists working in the salon. The job of reminding clients of their need for beauty services every month usually falls to the stylist, who may or may not have time to make the individual contacts necessary. Without follow-up, much repeat business is lost.

Service Providers typically use a combination of systems and methods for advertising, promoting, taking orders or reservations from Consumers, and keeping track of sales. These systems and methods generally involve books of account, paper calendars or appointment books, and desk-top or other local computerized systems with individual proprietary software for payment receipt and bookkeeping. These systems are not directly interactive with the Consumer and so the Consumer cannot use them to communicate to the Service Provider, nor can the Service Provider use them to communicate directly to the Consumer. Most Service Providers maintain separate documents, records, and programs for all of these various functions. In other words, Consumer preference data is maintained in a separate paper file from the financial books, both of which are separate from the appointment books, and all of these are separate from the various methods used for advertising, marketing, and follow-up contacts. As a result, data tends to be duplicated and Service Providers must expend significant labor in creating and maintaining these documents and records.

Even though Service Providers have methods and systems for scheduling and advertising, these methods and systems are not interactive with the Consumer. Therefore, a Service Provider must implement another method or system specifically for communication. For example, the Consumer may have to use a telephone and call a receptionist to request that the receptionist schedule an appointment. This method and system is limited because the Consumer cannot communicate with the Service Provider at any time, but only during business hours, assuming someone is answering telephones and assuming the telephones are not otherwise occupied. Furthermore, this communication method and system relies on the skills and abilities of the person answering the telephone, adding inevitably a measure of human error that is beyond the control of the Consumer and the Individual Service Provider.

There remains a need for a time- and cost-efficient method and system, preferably computerized and internet-accessible, that allows twenty-four hour access for Consumers to schedule appointments and order products or other services, and that will also reduce the labor and paperwork required to be maintained by Service Providers who work by appointment. Such a system and method would preferably facilitate and coordinate the aspects of scheduling, calendaring, marketing, and service tracking so as to reduce repetitive record keeping and increase communication and contact with Consumers.

BRIEF SUMMARY OF THE INVENTION

The present invention consists of an interactive website designed and developed as a centralized system for use by many Service Providers and Consumers in the coordination of appointment scheduling with options for online marketing in the form of web pages and automated and custom electronic messages and newsletters. This website provides for three types of entrants: Consumers, Individual Service Providers, and Company Service Providers.

This website allows a Consumer to log into the website, to review the Individual Service Provider's posted qualifications, services, and prices, to make, change, or cancel appointments, to request a position on a waiting list and receive notice that a preferred appointment time has become available, and to post personal Consumer data for the Individual Service Provider's review and retention. In one embodiment of the system, a Consumer would be able to search for a Company Service Provider by name or obtain a geographic listing of Company Service Providers that are part of the system.

The system offers Individual Service Providers the ability to post appointment schedules customized to their own preferences and needs, to retain personal Consumer data related to preferences and past services, to review and print out appointment schedule forms with Consumer notes, to send automatic confirmations and reminders to Consumers. It further provides a system of online marketing services by which Individual Service Providers can create individual web pages using pre-set templates and can send electronic notices, cards, and newsletters to Consumers for purposes of periodically contacting them, apprising them of new services and prices, and encouraging repeat business.

This invention may be utilized by a Company Service Provider to review and schedule appointments for the Individual Service Providers who work with the Company Service Providers. A Company Service Provider's access to data in the system is limited. The Company Service Provider may review an Individual Service Provider's schedule, but only one day at a time and only if authorized by the Individual Service Providers. In addition, Consumer data is not available to the Company Service Provider unless the Individual Service Provider has given access to the Company Service Provider.

It is an object of the present invention to provide a system and method whereby a Consumer can access the appointment schedule form of an Individual Service Provider at any time from any online connection and then make, change, or cancel an appointment, regardless of whether such access occurs during or outside of business hours and regardless of whether telephone contact is available.

Another object of this invention is to allow a Service Provider to access the appointment schedule form to add, change, or cancel appointments that are received from a Consumer by telephone or in person.

It is an object of the present invention to provide a system and method whereby Consumers can review the provider's qualifications, services, products, and pricing.

Another object of the present invention is to allow Individual Service Providers to post online customized appointment schedule forms for direct access by consumers who can make, change, and cancel their own appointments, reducing the need for manual scheduling by personnel of the Company Service Provider and reducing scheduling mistakes. As part of this object, the present invention is intended to increase the time spent in customer care, thereby enhancing the experience of the Consumer, increasing the likelihood of repeat business, and securing sales of products offered in relation to the services provided.

Another object of the present invention is to provide secure storage of personal data related to Consumer preferences, histories, and past services such that access to this personal data is limited to the specific Individual Service Provider who performs services for the Consumer and thus is unavailable to all other users of the system. As part of this object, the system is intended to allow a Company Service Provider's access only to the appointment schedule form and only for the Individual Service Providers who have authorized access.

Yet another object of the present invention is to allow Individual Service Providers to customize a web page advertising their services, prices, and qualifications.

An object of the present invention is to provide Consumers with automated advance notification by email of the appointments they have made, thereby reducing the number of times Consumers fail to keep appointments.

Another object of the present invention is to allow Consumers at any time to use any device through which they can access the system via the Internet to check their own appointment dates and times should they forget the time they have requested.

As a further object of this invention, marketing services are available to Service Providers in the form of message templates for email cards and newsletters that may be sent periodically to Consumers to provide for enhanced personalized customer care and regular contact reminders with the Consumer.

An object of this invention is to encourage Consumers to secure regular, periodic services based on the Individual Service Provider's recommendations by allowing Consumers to schedule more than one appointment in advance.

A further related object of this invention is to allow an Individual Service Provider to print mailing labels for Consumers.

Another object of this invention is to provide for income and commission reports for Individual Service Providers to allow for income tracking, and further to allow Individual Service Providers to access these records of account at any time from any online connection.

A further object of this invention is to provide a system and method that eliminates individual proprietary software and substitutes an online system that can be activated by the Consumer and by Individual and Company Service Providers without having to install or update software, read software manuals, and complete software training.

Yet another object of this invention is to provide Service Providers with a system and method in which data is stored for a significant period of time, is backed up regularly to avoid loss, and is available by personal contact with the system operator in the event the Service Provider's access becomes nonfunctional.

A more complete understanding of the present invention and the advantages thereof may be understood by referring to the following description taken in conjunction with the accompanying drawings. A specific embodiment of the system is described as applied to beauty salons, although this description should not be deemed a limitation. This invention is intended for use by Service Providers and Consumers in any industry.

BRIEF DESCRIPTION OF THE DRAWINGS

FIG. 5 is an illustration of one embodiment of a Consumer Profile Survey Template.

FIG. 7 is an illustration of one embodiment of an Appointment Profile Survey Template.

FIG. 12 is an illustration of one embodiment of the Weekly Schedule Review Template.

FIG. 13 is an illustration of one embodiment of the Monthly Schedule Review Template.

FIG. 14 is an illustration of one embodiment of a Consumer Record Review Template.

FIG. 15 is an illustration of one embodiment of a Consumer Survey Profile Template as presented to an Individual Service Provider in the method described in FIG. 9.

FIG. 16 is an illustration of one embodiment of a Weekly Schedule Options Template presented to an Individual Service Provider in the method described in FIG. 9.

FIG. 17 is an illustration of one embodiment of a Day Schedule Survey Template as presented to an Individual Service Provider in the method described in FIG. 9.

FIG. 18 is an illustration of one embodiment of a Search Option Template presented to an Individual Service Provider in the method described in FIG. 9.

FIG. 19 is an illustration of one embodiment of a Service Survey Template as presented to an Individual Service Provider in the method described in FIG. 9.

FIG. 20 is an illustration of one embodiment of an Income Report Record for an Individual Service Provider, generated in the method as described in FIG. 9.

DETAILED DESCRIPTION OF THE INVENTION

Figure 1:
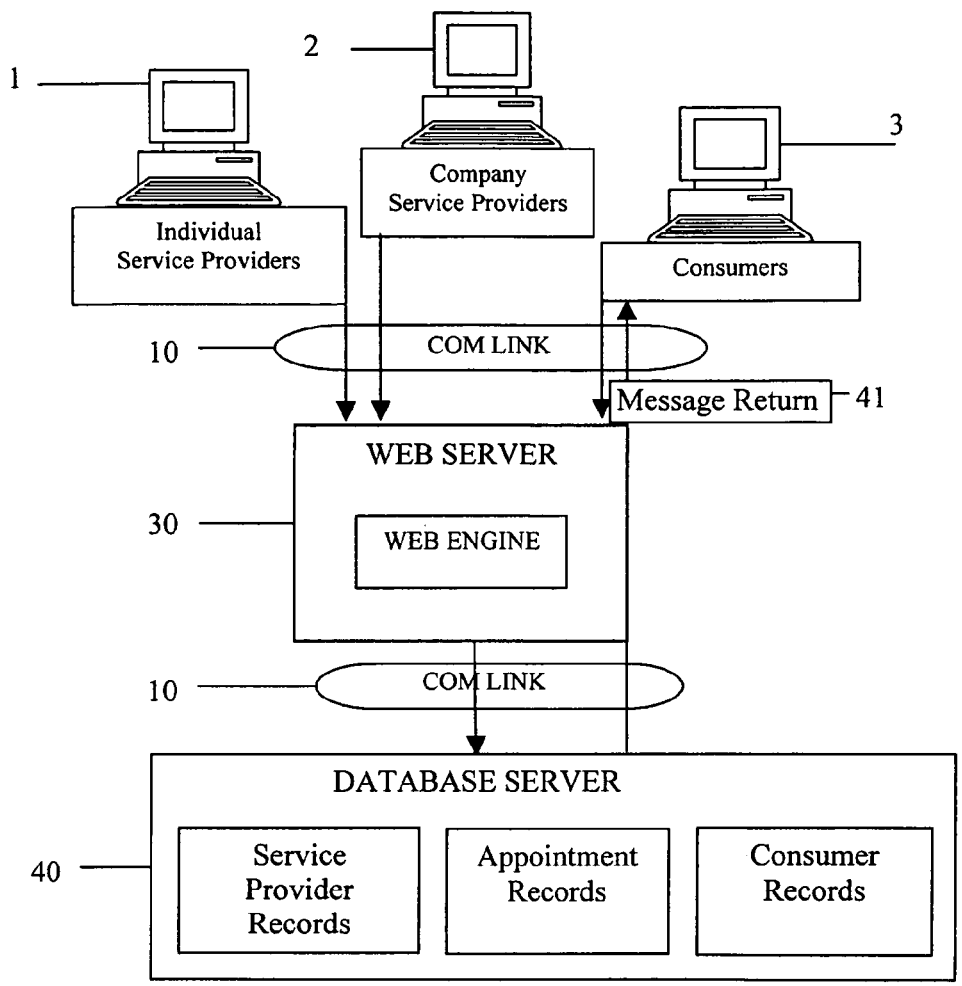
FIG. 1 illustrates a system and method for web-based, online coordination of appointment schedules and marketing for Service Providers accessible by multiple users.

Referring to FIG. 1, the present invention is illustrated as a system for web-based coordination of Individual Service Provider information and schedules, appointments, Consumer information, and Internet marketing. In general, the system accepts Service Provider Profiles from Individual Service Providers (1) and from Company Service Providers (2). It also accepts Consumer Profiles from Consumers (3) of the services provided by Individual Service Providers. The system stores a Service Provider's profile in a Service Provider Record in the Database Server (40) and a Consumer's Profile in a Consumer Record in the Database Server (40)

Figure 9:
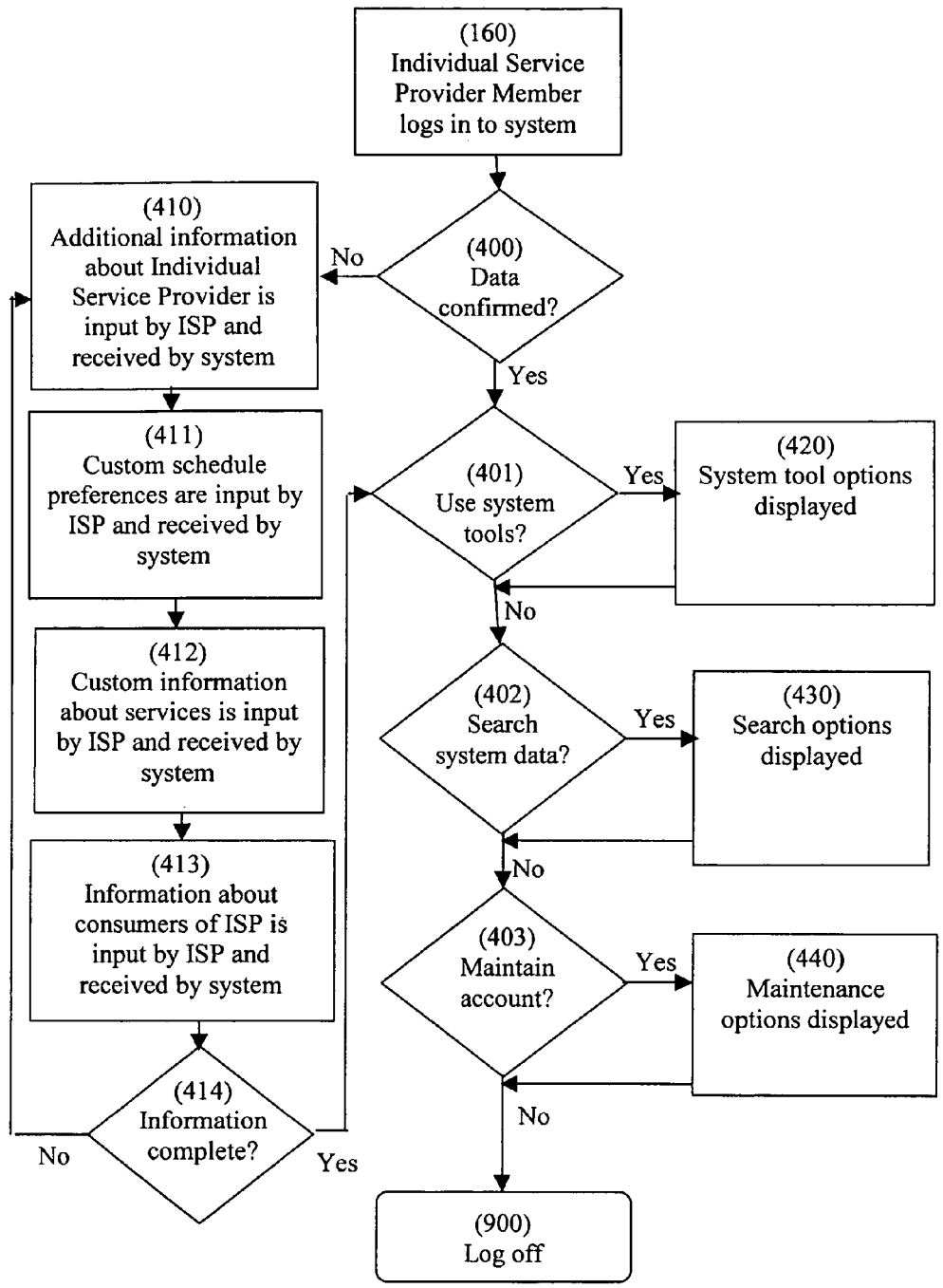
FIG. 9 illustrates a flowchart of a method for presenting system options to Individual Service Providers who are members of the system of FIG. 1.

Once a Profile is stored in the system, a Service Provider or Consumer is considered to be a member of the system. In the context of this patent, "member" refers to a Service Provider or Consumer that has a stored Profile in the system. Membership in the system is a preferred embodiment of the present invention, but is not necessary to the present invention. A registration or membership feature of the system is preferred for purposes of retaining information for the convenience of users who repeatedly or regularly access the system and for users of the system to utilize this data more efficiently, such as to compile mailing labels, to retain a history of services, or to track income from services rendered. One embodiment of the present invention requires that membership be paid, and another embodiment requires a premium charge for use of enhanced system tools, as illustrated in FIG. 9). Membership, paid membership, and premium membership are the preferred means of securing access to the system so that system data and system tools are available only to certain users.

At any time after becoming a member or registrant of the system, an Individual Service Provider (1) may enter preferences for customizing the schedule form, the services offered, the prices for services, and the content of communications to the Consumers.

These preferences are stored on the Database Server (40) in the Service Provider Record for that Individual Service Provider. An Individual Service Provider may additionally customize a web page within the system, the information and preferences for which are stored as part of the Provider's Record in the Database Server (40). A Consumer (3) may access the system to enter personal data, make appointments with his or her selected Individual Service Provider, and review the web page of that same Individual Service Provider. A Company Service Provider (2) may access the system to review the day's schedule for an Individual Service Provider (1), but only if the Individual Service Provider has authorized access to the Company Service Provider. In one embodiment of the invention, the Consumer may search records of Company Service Providers by company name or geographic location to locate a Company Service Provider at which there are Individual Service Providers who are members of the system.

After a Consumer has decided to become a member of the system in connection with receiving services from a particular Individual Service Provider, the Consumer may submit a Consumer Profile for review accessible to that particular Individual Service Provider. The system will store said Consumer Profile as a Consumer Record in the Database Server (40). The Consumer may further submit appointment data for the particular Individual Service Provider, and the Consumer may edit or delete any appointment data that he or she has previously submitted for storage in the Database Server (40). An Individual Service Provider may also enter Consumer appointments, identification data, and service notes for existing Consumers of the Individual Service Provider and may submit updates and corrections to the records of any of the Consumers that are using the services of that same Individual Service Provider. For each appointment made, an automated reminder notification will be sent by electronic message to the Consumer in advance of the appointment (41) at a time selected by the Individual Service Provider initially, as described in FIGS. 6 and 9.

In specific operation of the system, a Service Provider (1 or 2) or a Consumer (3) utilizes an Internet-accessible device via a communications link (10) to access the system web engine residing on the web server (30). The Individual Service Provider initially enters data into an Individual Service Provider Profile Survey Template generated by the web engine (30), consisting of a software module contained on the web server (30). This process is further illustrated in FIG. 4. A Company Service Provider initially follows a similar procedure, although the data entered will differ. The process for Company Service Providers is further illustrated in FIG. 4. The respective Service Provider Profile information may be communicated by the web engine software on the Web Server (30) to the Database Server (40) through a communications link (10) for processing, indexing, and storing as a Service Provider Record on the Database Server (40).

A Consumer (3) utilizes a similar procedure to access the system web engine residing on the web server (30) and enters data into a Consumer Profile Survey Template generated by the web engine (30). This process is further illustrated in FIG. 6. On submission, the Consumer Profile data may be communicated by the web engine software on the Web Server (30) to the Database Server (40) through a communications link (10) for processing, indexing, and storing as a Consumer Record on the Database Server (40).

After a Service Provider's Profile has been submitted and stored in a Service Provider Record in the Database Server (40), the Service Provider is qualified as a member of the system, which allows the Service Provider access to the web engine residing on the Web Server (30) for purposes of using system tools. The system tools available to a Service Provider will depend on whether said Provider is an Individual or Company.

An Individual Service Provider may submit preferences to customize the schedule form, which preferences are submitted to the web engine on the Web Server (30) and communicated to the Database Server (40) for processing, indexing, and storing as a part of the Service Provider Record for that specific Individual Service Provider using the software modules residing on the Database Server (40). An Individual Service Provider who is a member of the system may access the system via the web engine on the Web Server (30) in order to browse, review, edit, and delete schedule preferences, appointment data, and Consumer information, which procedures are further illustrated in FIG. 9. In one embodiment of the system, an Individual Service Provider may have access to a messaging procedure wherein the Provider may send electronic cards, newsletters, or other communications to a Consumer as a means of following up on the Consumer's business and encouraging sales and repeat business. In another embodiment of the system, an Individual Service Provider may create a personalized web page using templates that are stored in the Database Server (40). The Individual Service Provider's personalization information is stored in the Database Server as part of the Service Provider Record for that particular Individual Service Provider, and the system will access that Record and merge the stored information into the selected web page template when a Consumer is using the system. By means of this generated web page, the Consumer may review the qualifications, services, and pricing of the Individual Service Provider and may make or change an appointment. In yet another embodiment of the system, some data and system tools in the system, such as the messaging and web page procedures, will be available only to Individual Service Providers who have paid a premium charge.

A Company Service Provider (2) may access through the Web Server the appointment data stored in Appointment Records on the Database Server for selected Individual Service Providers. Said Appointment Records are available only to the extent that access has been authorized by a certain Individual Service Provider. The Company Service Provider's access may be limited to viewing a daily schedule, or alternatively, the Company Service Provider may additionally be permitted to make and change appointments for the Individual Service Provider. These procedures are further detailed in FIG. 8.

The system in FIG. 1 includes a Web Server (30) in communication with one or more Service Providers (1 and 2) and Consumers (3). It also includes a Database Server (40) in communication with the Web Server (30). Communication between these components of the system may be implemented using hardware and software associated with one or more communication links (10). FIG. 1 illustrates the system as being a client/server environment, but each system component may be any type of computer or device operating in any suitable environment that communicates using one or more communication links. For example, the components could be arranged in a peer-to-peer computing environment or any another environment that suitably supports communication among the different components.

The Service Providers (1 and 2) and Consumers (3), the Web Server (30) and Database Server (40) may operate on one or more computing devices with input and output modules by which a provider may enter and view data. Examples include workstations, client computers, terminals, hand-held devices, and personal computers. Said devices may include web browsers and other user interfaces, memory, processing components, and peripherals common to computing devices. Input devices may include keypads, touch screens, mouse devices, or other devices that can be used to enter information into a computer system. Output devices include monitors and other output devices that convey information associated with the system, including digital, visual, facsimile, and audio data. A computer processor and its related memory execute instructions and manipulate data pursuant to the operation of the system. For example, the processor may execute coded instructions that are stored in memory on data that is also stored in the memory.

The Web Server (30) and Database Server (40) may comprise general-purpose computers or other computing platforms having processor and memory components. Alternatively, they may be any combination of hardware and software that includes components suitable for processing and storing data-encoded instructions. The Web Server (30) and Database Server (40) may be physically separate servers communicating through a communication link (10) as illustrated, or they may reside on a single common server and be separate merely in function. In its preferred embodiment, the Database Server (40), whether or not the same physical server as the Web Server (30), would also include software modules or components that insulate and secure the database software and server from public network access, such as a firewall or similarly suitable means of security. Thus, the components of the Database Server (40) can be secured while the components of the Web Server (30) can be freely or selectively accessed over the communication links with the public communications network.

Software modules, including web engines and other suitable components, reside on the Web Server (30) and provide the necessary processing routines, user interfaces, and forms to allow Service Providers (1 and 2) and Consumers (3) who access the website on the Web Server (30) to utilize the system for performing the respective functions further illustrated with reference to FIGS. 3 through 20. Similarly, software modules, including database engines and other suitable components, reside on the Database Server (40) and provide the necessary processing, filtering, indexing, and storing of provider and Consumer data and appointment data.

Any of the communication links (10) may be dedicated or switched links of a private or public network. To illustrate, the communication links may be implemented using a fiber, cable, or twisted-pair connection over a public-switched telephone network, a satellite, radio, microwave, or other wireless link, or other suitable communication link between the system components. The system components may be part of any suitable network or interconnection of computing devices, such as a local area network (LAN) or a wide area network (WAN). In one embodiment, components in the system communicate over the Internet using the World Wide Web (WWW), a File Transfer Protocol (FTP), any of a variety of link utilities software, mobile objects, electronic mail, bulletin boards, or other suitable communication techniques. For example, Service Providers (1 and 2) and Consumers (3) may maintain and execute on their own personal computing devices a browser or other suitable parsing program for accessing and communicating data that is addressed by Uniform Resource Locations (URLs) using one or more communication links.

The system components may be implemented in a programming environment that supports access or linking by means of URL addresses. As such, the content of system modules and databases may be constructed using Hypertext Mark-Up Language (HTML), Standard Generalized Mark-Up Language (SGML), Virtual Reality Mark-Up Language (VRML), Java Script, or any other appropriate content development language. The system modules may include program code and other appropriate self-executing code.

In the Web Server (30) and Database Server (40), and within the computing devices of the Service Providers (1 and 2) and Consumers (3), the memory utilized may comprise one or more files, data structures, lists, or other arrangements of information stored by any suitable and convenient means. Examples include one or more components of random access memory (RAM), read-only memory (ROM), magnetic computer disks, CD-ROMs, other magnetic or optical storage media, or any other volatile or nonvolatile memory. It should be understood that the databases, engines, and other software modules of the system might be internal or external to the illustrated components of the system, depending on the particular implementation, and such modules may be separated or integral to other databases. Any appropriate referencing, indexing, or addressing information can be used to relate back to an address or location of a database, file, or object within the system.

Figure 2:
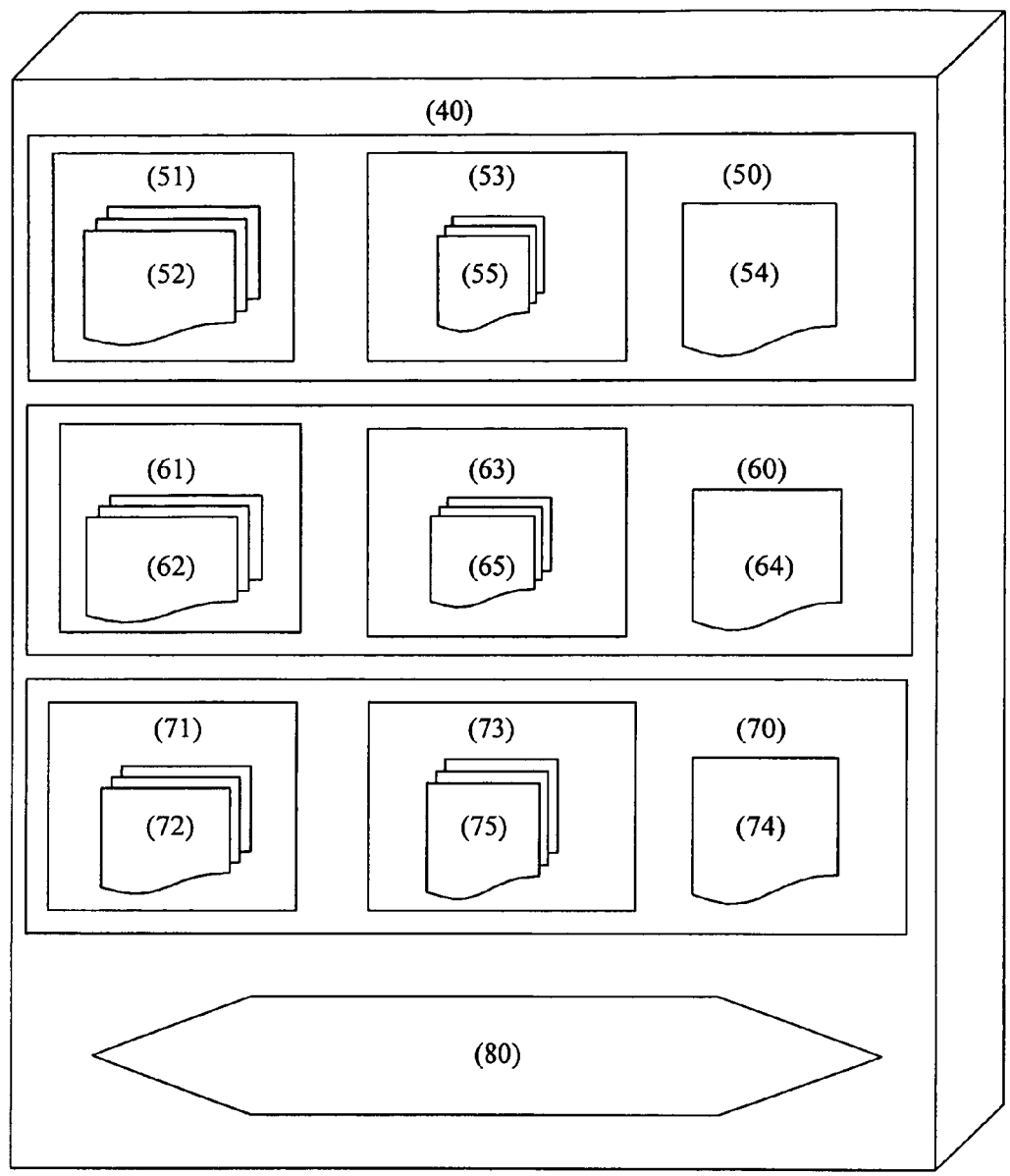
FIG. 2 illustrates an embodiment of the Database Server for the present invention.

FIG. 2 illustrates a more detailed embodiment of the Database Server (40), showing a Service Provider Engine (50), an Appointment Engine (60), a Consumer Engine (70), and a Filter Engine (80). In one embodiment of the system, any of these engines may be divided into two or more engines with links between them so as to avoid duplication of data, reduce data storage, and improve access speed and efficiency.

In the illustrated embodiment, the Service Provider Engine (50) includes a Service Provider Record Database (51), Service Provider Review Templates (54), and a Service Provider Map (53). A plurality of Service Provider. Records (52) are generated from the Service Provider Profiles input by Individual and Company Service Providers utilizing the web engine on the Web Server, as illustrated in FIG. 1. As an illustration, a Service Provider accessing the web engine on the Web Server may make a selection to become a system member. For a Company Service Provider, the web engine displays a Company Service Provider Profile Survey Template into which the provider enters qualification data. The Web Engine on the Web Server transfers the data entered to the Service Provider Engine (50) on the Database Server (40), where the Service Provider Engine (50) organizes and stores it in a Service Provider Record (52) of the Service Provider Record Database (51). For an Individual Service Provider, the process is similar except that the Individual Service Provider, after being accepted as a member of the system, will enter qualification data and customization preferences through a series of Survey Templates. On submission of the data to the Web Engine on the Web Server, the Web Engine will transfer the data to the Service Provider Engine (50), which in turn organizes and stores it in the Individual's Service Provider Record (52) of the Service Provider Database (51). The method for using this system is further described in FIGS. 10 through 20. By storing the data in a Service Provider Record (52), the system allows a Service Provider to access the same data in the future without having to re-enter the data.

Service Provider Review Templates (54) are forms generated by the Service Provider Engine (50). These Templates (54) include fields used in the Service Provider Record (52) to store data submitted by means of a Service Provider Profile Template generated by the web engine. A Service Provider may access and review the data stored in its own Service Provider Records by submitting a request to the web engine on the Web Server, which request is then communicated by the web engine to the Service Provider Engine (50) on the Database Server (40). On receipt of the submitted request, the Service Provider Engine (50) generates a Service Provider Review Template (54) containing the data previously stored for the particular Service Provider in the Service Provider's Record (52). The data retrieved and shown in the Review Template will depend on whether the Service Provider is a Company or an Individual. A method for using the system is further described in FIGS. 8 and 9.

The illustrated embodiment in FIG. 2, shows an Appointment Engine (60) consisting of an Appointment Record Database (61) an Appointment Template (64), and an Appointment Map (63). A plurality of Appointment Records (62) are generated from appointment data input by Service Providers and Consumers utilizing the web engine on the Web Server, as illustrated in FIG. 1. Each Appointment Record (62) is stored in the Appointment Record Database (61) when submitted by the Web Server. For example, a Consumer accessing the web engine on the Web Server may select a specific service and appointment date and time by means of an Appointment Survey Template generated by the Web Engine. The Web Engine on the Web Server transfers the data entered to the Appointment Engine (60) on the Database Server (40), where the Appointment Engine (60) organizes and returns a response to the Consumer of the dates and times available for that service. The Consumer may then select from the appointments generated or may start the Appointment Survey Template over again. Once the Consumer confirms an appointment time, the data is submitted to the Web Engine, which transfers the data entered to the Appointment Engine (60), which in turn stores it in an Appointment Record (62) of the Appointment Database (61).

For a Service Provider, the Appointment Record Database may be accessed for purposes of reviewing appointment data stored for an Individual Service Provider. The data retrieved and shown in the Review Template will depend on whether the Service Provider is a Company or an Individual and on the parameters of the request. For example, a Company Service Provider may be authorized to review a daily schedule for only the Individual Service Provider who has given the Company Service Provider access. An Individual Service Provider may review his or her own schedule for a day, week, or month. The Individual or Company Service Provider makes this request though the web engine on the Web Server, which in turn transmits the request to the Appointment Engine (50) on the Database Server (40). On receipt of the submitted request, the Appointment Engine (50) generates a Schedule Review Template (54) containing the data previously stored for the particular Appointment Records (52) that match the request transmitted and using the schedule preferences stored in the Service Provider Record for the Individual Service Provider. A method for using the system is further described in FIGS. 8 and 9.

FIG. 2 also illustrates as part of the Database Server a Consumer Engine (70), which includes a Consumer Record Database (71), a Consumer Review Template (74), and a Consumer Map (73). A plurality of Consumer Records (72) are generated from the Consumer Profiles input by Consumers utilizing the web engine on the Web Server, as illustrated in FIG. 1. Each Consumer Record (72) is stored in the Consumer Record Database when submitted by the Web Server. For example, a Consumer accessing the web engine on the Web Server may make a selection to become a system member, in which event the web engine displays a Consumer Profile Template into which the Consumer enters qualification data. The Web Engine on the Web Server transfers the data entered to the Consumer Engine (70) on the Database Server (40), where the Consumer Engine (70) organizes and stores it in a Consumer Record (72) of the Consumer Record Database (71). By storing the data in a Consumer Record (72), the system allows a Consumer to access the same data in the future without having to re-enter it. In addition, this information can be accessed by the Individual Service Provider who provides services to the Consumer. The Consumer's Record may contain additional information entered by the Individual Service Provider but hidden from access by the Consumer, which data may include service history, personal observation notes, and similar information that allows the Individual Service Provider to custom-tailor the services to the Consumer. Company Service Providers cannot access Consumer Records unless the Individual Service Provider has authorized access to the Company Service Provider.

In the embodiment in FIG. 2, a Consumer may access the system at no charge, but his or her access is limited to reviewing the web page for his or her own Individual Service Provider, reviewing and entering appointment data for that same Provider, and reviewing and submitting data to his or her own Consumer Record. The system limits access to Service Providers who have become members or registrants of the system. Thus, a Service Provider may access the system only if the Service Provider has entered required qualification data, which data must be confirmed by the Filter Engine (80) before access to the system is permitted. In another embodiment of the system, access to the full system may be further limited to Individual Service Providers who have become paid members of the system. In another embodiment of the system, Individual Service Providers may have access to enhanced system tools on payment of a premium for the additional usage.

The Filter Engine (90) is a software module or other suitable combination software and/or hardware operable to screen profile data entered into the Service Provider Profile Templates, the Consumer Profile Template, and the Appointment Template generated by the web engine on the Web Server before such data is stored in the Database Server (40). In one embodiment, the Filter Engine (90) includes automated benchmarks by which data in any of the Templates is evaluated before being approved. For example, the first level of benchmarks may simply confirm that valid data has been entered in each field of the Template in the web engine. A more complex evaluation may include determining whether or not the data entered for an appointment is consistent with the Service Provider's customized preferences for scheduling.

For the data stored in a Service Provider Record (52), a Service Provider Mapping Engine (53) generates a plurality of Service Provider Identifiers (55). Each Service Provider Identifier (55) consists of unique data, such as alphanumeric strings, utilized to index a particular member's qualification data. For example, a particular Service Provider Record (52) may be parsed for qualification data related to name, geography, and technical qualifications. The parsing results in assignment of Service Provider Identifiers (55), which are used by the Service Provider Mapping Engine (53) to index and list the providers of the system by categories corresponding to their qualifications. The Service Provider Mapping Engine (53) is capable of producing a list or chart, referred to as a Service Provider Map, showing all members of the system with the specific qualifications mapped. The Service Provider Map may be a single or multi-dimensional index having one or more tiers or levels of member qualification data under which the Service Provider Records (52) are listed by a plurality of Service Provider Identifiers (55). The Service Provider Mapping Engine is utilized by system operators for purposes of reviewing and maintaining the Service Provider Records. It is also utilized by a Company Service Provider for limited access to information, such as the names of the Individual Service Providers that work with the Company Service Provider.

The mapping engines for the other engines shown in the illustrated embodiment in FIG. 2 operate in similar fashion to the Service Provider Mapping Engine (53) for the Service Provider Engine (50), with the primary distinction being the data that each Engine enters, organizes, and stores into the system. For example, an Individual Service Provider may use the Consumer Mapping Engine (73) to review a list of the contact information for its own Consumers or to generate a mailing list for them. An Individual Service Provider may use the Appointment Mapping Engine (63) to review appointment times and services on a daily or weekly schedule form. These Engines use Consumer Identifiers (65) or Appointment Identifiers (75), respectfully, to access and compile the data.

Figure 3:
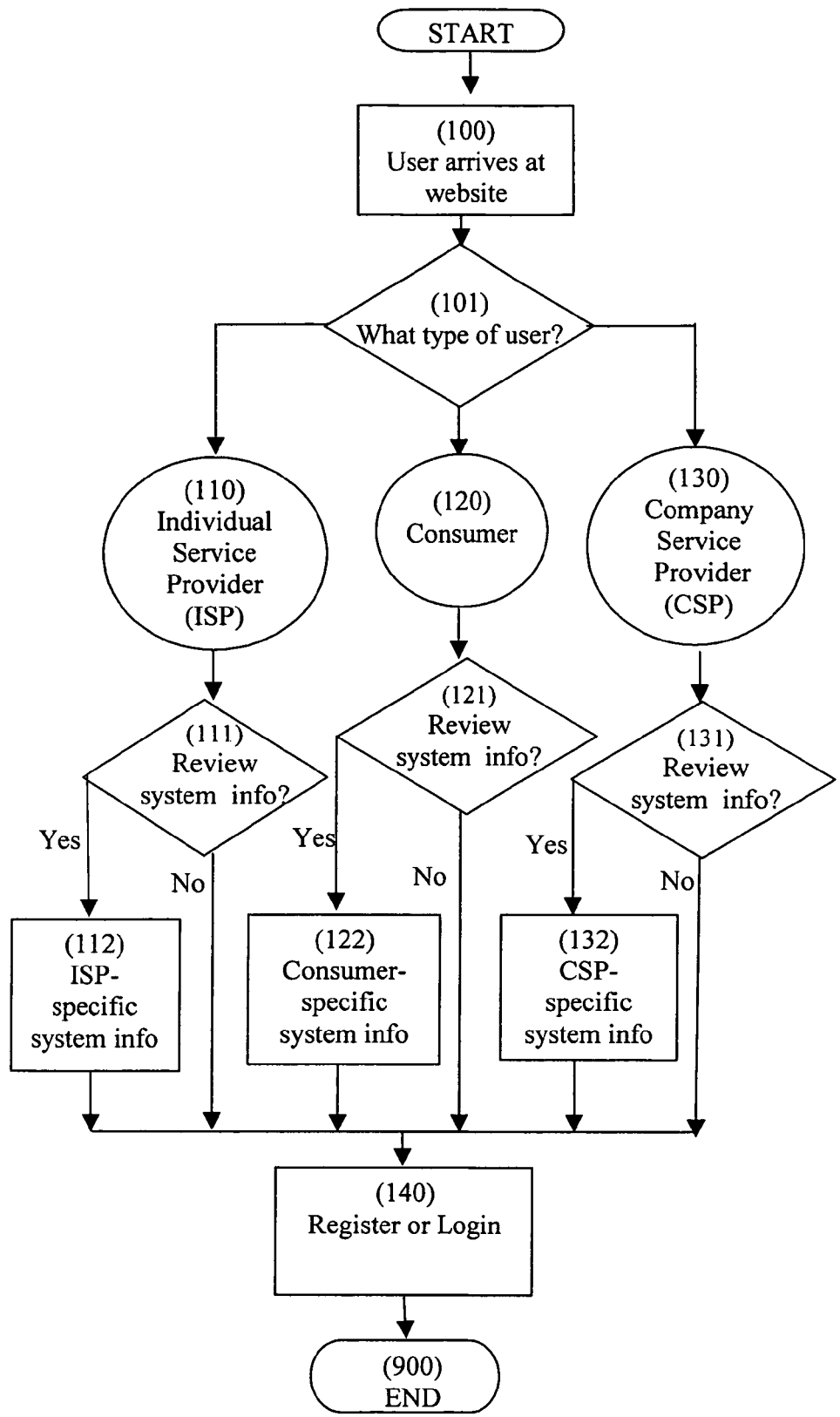
FIG. 3 illustrates a flowchart of a method for initiating interactive use of the system of FIG. 1.

In FIG. 3, a method for a user's initial contact with the present invention is represented in a flow chart. When a user arrives at the website address and accesses through a user interface a representation of the website on the web server (100), the user is asked to select whether the user is a Consumer, an Individual Service Provider, or a Company Service Provider (101). When the user selects an option, an input corresponding to the selection is received by the web engine on the Web Server. The web engine compares the user's input selection to preset identifiers that allow the user access to type-specific system information and system entry. An Individual Service Provider (110) is presented with a web page having content specific to the Individual Service Provider, a Consumer (120) is shown a web page having content specific to the Consumer, and a Company Service Provider (130) sees a web page specific to the Company Service Provider. As an illustration, if the system is for beauty professionals and clients, a user of the system may be asked to select whether he or she is an individual beauty professional, a beauty salon employee, or a client of the beauty professional (101). If the user is a client, the system will permit the client to review certain information about the system that is relevant only to the client (122). For example, the client may be offered a rebate against the cost of beauty services if the client refers a beauty professional to the system. This information would be available to the client only, not to a salon employee or an individual beauty professional. In contrast, if the user were a salon employee (130), the employee would be able to review general information about the system only (132). If the user were an individual beauty professional (110), the professional would be able to read about all of the features of the system and the benefits of membership (112). All users of the system may select to review type-specific system information (112, 122, and 132) or to enter and use the system as a member (140).

Figure 4:
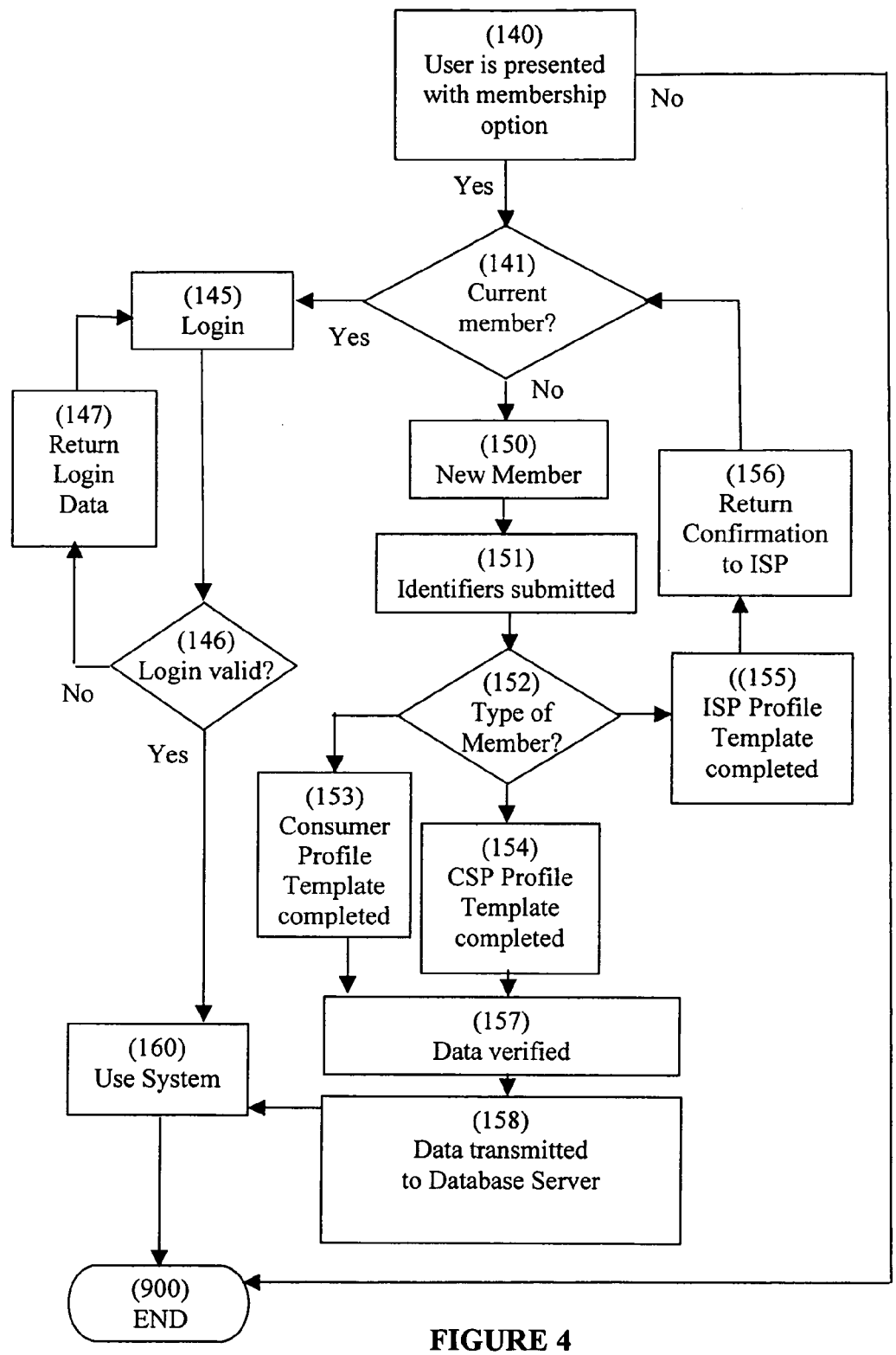
FIG. 4 illustrates a flowchart of a method for allowing users access to the system of FIG. 1 while securing the system against general public access.

The flow chart in FIG. 4 illustrates a method by which access to the system may be limited by membership qualification. In this context, "membership" does not mean "paid membership" but simply the submission of profile data to the system, which then creates and stores a retrievable record for the user in the system. Each type of user identified in FIG. 3 may select the membership option (140) at any time during his or her review of the type-specific system information. If a user does not want to exercise the membership option during this review, the user's other option is to leave the website (900). When the user determines to exercise the membership option (141), the user may opt to login as a current member (145) or enroll as a new member (150).

When the user selects a membership option, an input corresponding to the selection is received by the web engine on the Web Server. The web engine compares the user's input selection to user option identifiers to determine if the user selected the option to become a new member (150). If so, the user submits user-specific identifiers, such as a unique user identification, password, and email address, to the system (151). On receipt of the user-specific identifier (151), the web engine generates a profile survey template.

The profile survey template generated is different for each type of user, a selection that was initially made at Step 101 in FIG. 3. For a Consumer, a Consumer Profile Survey Template (153) is generated by the web engine on the Web Server and presented to the user for completion. If the user type identifier is for a Company Service Provider, a Consumer Profile Survey Template (154) is generated by the web engine on the Web Server and presented to the user for completion. If the user type identifier is for an Individual Service Provider, an Individual Service Provider Profile Survey Template (155) is generated by the web engine on the Web Server and presented to the user for completion.

A Consumer or Company Service Provider will enter relevant information related to name, address, and communication into the respective Profile Survey Template (153 or 154). The Profile Survey Template may permit the user to enter textual content into fields or dialog boxes, and it may permit the user to select pre-programmed options in the Template. The Template may also include links, pop-up windows, selectable options or icons, highlightable data items, or information otherwise generated by the system. When the provider submits the profile data by selecting a submission button or other indicator, the system may verify the data (156), which is then transmitted to the Database Server and saved as either a Service Provider Record or a Consumer Record, respectively (157) so that the data can be accessed and reviewed in the future. In one embodiment of the system, the system generates a data confirmation form for the user to review the data as input and to make corrections to it prior to submission. When the data is saved, the respective Mapping Engine immediately parses the data and generates unique identifiers for the Service Provider or Consumer Record, respectively, for indexing, review, and retrieval purposes, as described in FIG. 2. After the Record has been stored (158), the user may begin to use the system without having to log in (145) or the provider may log off and exit (900). Figure XX illustrates the method for a Consumer's use of the system after log-on, while Figure XX illustrates the same for a Company Service Provider.

For an Individual Service Provider, the Profile Survey Template (155) is similar to those for the Company Service Provider, but the Individual Service Provider must enter additional data. For example, data on qualifications may be requested. In one embodiment of the present invention, the Individual Service Provider may be required to submit payment information before being allowed to access system tools. When the Individual Service Provider has completed and submitted the respective Profile Survey Template to the web engine, the system will send an electronic message (156), generated by the web engine on the Web Server, to the email address provided by the Individual Service Provider in the Profile Template. The system directs the Provider to review the message, which contains information and instructions for use of the system. Until the Individual Service Provider enters the system by logging on as a current member, the Individual Service Provider's membership in the system is not activated. The procedure for activating membership and submitting custom preferences to the system is further described in FIG. 9.

At Step 141, a user who is a current member of the system, including an Individual Service Provider who has recently submitted membership data at Step 156, may choose to log in. The web engine on the Web Server will determine if the existing user login option was selected (141). If this selection was made, the user will be asked to submit the login identifiers (145) and the system will verify the login information before permitting the member access to the system (146). If the member has entered incorrect login information, the member has the option of requesting that the system return a message (147) to the member's email account stating the previously input data for log-on as stored in the user's Record. In this case, the member must return to the web engine after receiving said message with the relevant information and must start the login procedure over again (140). After a member has logged into the system, the member may proceed to use the system tools (160) available to the member. The member provider has the option of logging off and exiting the system at any time (900).

FIG. 5 illustrates one embodiment of a Consumer Profile Survey Template that is presented to a Consumer in Step 153 of FIG. 4 in order for the Consumer to enter data relevant to becoming a member in the system and to submit said data for transmission into the system. A Consumer Profile Survey Template is generated by the web engine and includes separate fields or dialog boxes for data entry by the Consumer. Such fields may include fields or dialog boxes for textual content as typed by the Consumer in any format or in limited format, such as pre-determined formats for telephone numbers or zip codes. They may also include fields containing pre-generated options selectable by the Consumer, selectable or manipulatable icons, buttons, links, highlightable data, or other selectable data pre-generated by the system and presented to the Consumer.

Examples of the fields includable on the Consumer Profile Survey Template are illustrated in the embodiment displayed in FIG. 5. The Template contains fields for contact information (200), important dates (201), and Service Provider identification (202). As an illustration, the Consumer may enter contact information (200) related to the Consumer's first and last names, address, email address, and communication numbers into fields that accept textual content freely typed in by the Consumer. The Consumer may be able to enter a specific telephone number and email address in textual content fields that may have pre-set formats, thereby verifying that any entry consists of a complete telephone number with area code and a recognizable email address. The fields for important dates (201) may include selectable fields for the month and day. Fields for textual content are also provided for the Consumer to specify the Service Provider (202), which fields must be fully completed by the Consumer before the data will be approved by the web engine for transmission to the Database Server, as indicated by the star or asterisk placed before each field. Identification of the Service Provider is mandatory for the Consumer to use the system. If the data entered in these fields does not match data stored in an Individual Service Provider Record, the Consumer will not be able to continue the membership registration process. The form generated will include at least one button or other selection indicator. For example, a button may be provided by which the Service Provider can select to transmit to the system the data entered in the Profile Survey Template (203).

Figure 6:
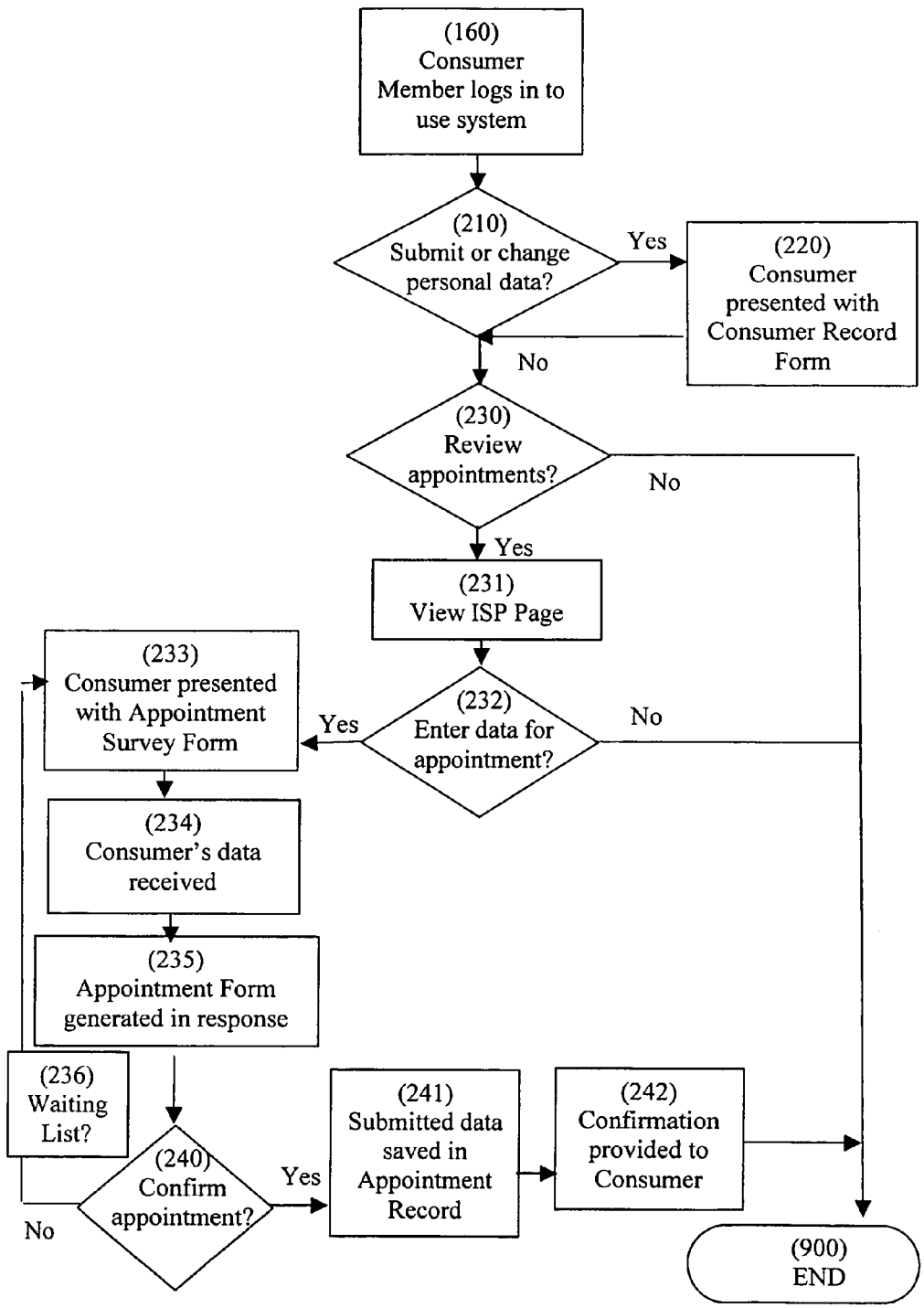
FIG. 6 illustrates a flowchart of a method for presenting system options to Consumers who are members of the system of FIG. 1.

In FIG. 6, the flowchart illustrates a method for presenting a Consumer of the present invention with the system tools that are available to the Consumer. In Step 160, the Consumer has already entered the system, such as by accessing the web engine through a user interface and by logging in, as illustrated in FIGS. 1 through 4. When the Consumer arrives at Step 160, the Consumer is presented with a plurality of optional procedures. For example, the Consumer may review and alter his or her personal data previously stored in the system (210) or enter appointment data into the system (230). In one embodiment of this invention, a Consumer may request issuance of a rebate to be used to reduce the cost of services from the Consumer's Service Provider, the rebate being issued to the Consumer in exchange for the Consumer's referral of a new Individual Service Provider to the system.

At Step 210, the Consumer may select whether to review or submit changes to his or her Consumer Record previously generated when the Consumer submitted data using a Profile Survey Template as described in Step 153 of FIG. 4 to the Consumer Records Database as illustrated in FIG. 2. If the Consumer selects the option to review or change the Record, the web engine transmits the request to the Consumer Records Engine of the Consumer Records Database. A form is generated showing the existing data stored in the Consumer's Record with options to alter the information (220). When the Consumer has completed reviewing and/or changing the data shown in the form, the Consumer enters the data by means of a submission button or other indicator. The web engine then transmits the information to the Consumer Records on the Database Server and presents the Consumer with other options available.

At Step 230, the Consumer may select whether to review his or her appointments with the Individual Service Provider. If the Consumer decides not to make this review, the Consumer may sign or log off of the system (900). If the web engine receives a positive option, the web engine transmits the request to the Database Server, where the Consumer and Service Provider Engines match data identifying the Service Provider in the Consumer Record to identifiers used to index the Individual Service Providers. On finding a match, the Service Provider Database generates a web page (231) for the Individual Service Provider, which page may be standard or customized as described in FIG. 9 subsequently. The Consumer may select to make or alter an appointment by means of a hyperlink, button, or other indicator (232) or to sign or log off of the system (900).

If the web engine receives a positive option at Step 232, the web engine presents the Consumer with an Appointment Survey Template (233) by means of which the Consumer can enter and submit the service requested and preferences related to the time and date for the appointment (234). An illustration of such a Template is shown in FIG. 7. When the Consumer submits the selections made in the Appointment Survey Template, the web engine transmits that data to the Appointment Engine in the Appointment Records Database, where the data is matched with stored Appointment Records. The Appointment Engine generates a form showing the appointment data found in response to the appointment request, and the form is transmitted by means of the web engine to the Consumer (235). The Consumer may then confirm any of the appointment times shown (240). If a negative option is received at Step 240, the Consumer may return to the Appointment Survey Template (233) and submit data to the web engine again. Before returning to submit new data into the Appointment Survey Template (233), the Consumer is offered an option (236) to be placed on a Waiting List for the preferred time.

The Waiting List feature of the system will activate in the event that the specified preferred time later becomes available. At that time, the Waiting List feature will automatically send an electronic message to the Consumer notifying him or her of the availability of the appointment time. The Consumer then has the opportunity to log into the system to change appointment times (160), or the Consumer may utilize the telephone or other communication means to request the Individual Service Provider or the Company Service Provider to alter the appointments.

If a positive option is received at Step 240, the system submits the data to the Appointment Database where it is saved in an Appointment Record (241). Once the Appointment Record is saved, the system will inform the Consumer by generating a printable Appointment Confirmation Form and by returning an automatic electronic message to the Consumer confirming the appointment (242). In addition, the system will send by electronic mail a reminder of the appointment to the Consumer a certain number of days in advance, the number being set in accordance with the customized preferences entered by the Individual Service Provider as described in FIG. 9 subsequently. After confirming the new, changed, or deleted appointment, the Consumer may sign or log off of the system (900). In one embodiment of this invention, the consumer may receive a message displaying recommended future appointments as pre-determined by the Individual Service Provider, and the Consumer may then select by means of an indicator, hyperlink, or otherwise to return to step 233 to make another appointment.

FIG. 7 illustrates one embodiment of an Appointment Survey Template that is presented to a Consumer in Step 233 of FIG. 6 in order for the Consumer to enter data relevant to scheduling an appointment with the Individual Service Provider. This Appointment Survey Template would be generated by the web engine and includes separate fields or dialog boxes for data entry by the Consumer. Such fields may include fields or dialog boxes for textual content as typed by the Consumer in any format or in limited format, such as pre-determined formats for hours and minutes. They may also include fields containing pre-generated options selectable by the Consumer, selectable or manipulatable icons, buttons, links, highlightable data, or other selectable data pre-generated by the system and presented to the Consumer. For example, FIG. 7 illustrates fields having selectable data pre-generated for months, days, and years.

Figure 8:
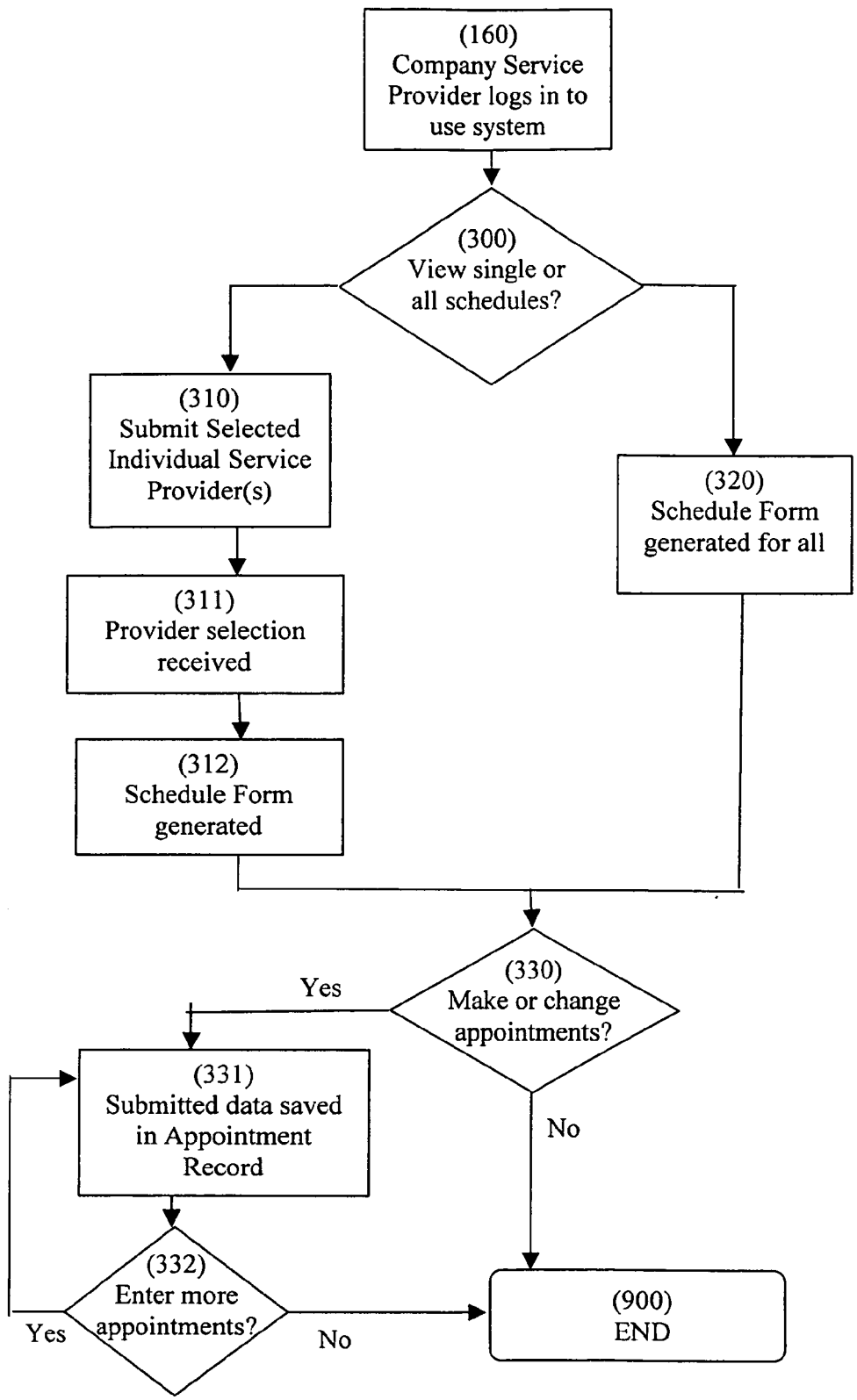
FIG. 8 illustrates a flowchart of a method for presenting system options to Company Service Providers who are members of the system of FIG. 1.

Referring to FIG. 8, a flowchart is provided to illustrate a method by which the present invention may present a Company Service Provider with the system tools that are available to such Provider. In Step 160, the Company Service Provider has already entered the system by accessing the web engine through a user interface and by logging in as a member, as illustrated in FIGS. 1 through 4. When the Company Service Provider arrives at Step 160, it is presented with two options. It may select to view the schedule of a single Individual Service Provider or it may choose to view all schedules at one time (300). If the Company Service Provider selects to view all schedules, the system generates a form showing the same days schedules of all of the Individual Service Providers (320) that have given permission for the Company Service Providers access. The preferable number of schedules shown is five or less due to limiting monitor screen sizes. Alternatively, if the Company Service Provider selects to view one schedule (310), the Service Provider Engine generates a list of all Individual Service Providers who have authorized the Company Service Provider to review their Schedule Records and the Company Service Provider may select (311) to review the same day's schedule of one of the Individual Service Providers listed (321).

The Company Service Provider's access to information stored in the Database Server is limited by preferences set by the Individual Service Provider and stored in such Provider's Service Provider Record. The Individual Service Provider may authorize the Company Service Provider access to certain information related to the Consumer's appointments. In all cases, the system prohibits the Company's Service Provider's access to any of the information stored in the Consumer's Record unless administration password is given by the Individual Service Provider to the Company Service Provider.

If the Company Service Provider is authorized to make or change an appointment for a Consumer, the Company Service Provider may select this option (330), and the web engine on the Web Server will display an Appointment Survey Template (331). On completion of this Template, the Company Service Provider may submit the data input into the Appointment Survey Template by means of a hyperlink, button, or other indicator. The system receives the data via the web engine on the Web Server, which transmits it to the Appointment Engine on the Database Server, where it is stored in an Appointment Record (332). Using a procedure similar to that set forth for the Consumer in FIG. 6, the system will automatically return an appointment confirmation to the Consumer by an electronic message and will automatically send to the Consumer by electronic message an appointment reminder at the pre-set time selected by the Individual Service Provider. After inputting data for a Consumer, the Company Service Provider may stay on the system (300) or may choose to log off (900).

Referring to FIG. 9, a method is illustrated for the use of the system of the present invention by the Individual Service Provider. The Individual Service Provider has completed the log-in procedure (160) as described in FIG. 4. The web engine on the Web Server transmits the log-in information input by the Individual Service Provider to the Service Provider Engine of the Service Provider Database on the Database Server. The Service Provider Engine makes a comparison with the stored data records to determine whether the Individual Service Provider has completed the customization process or is a new member (400).

If the system determines that customization is not complete, the system permits the Individual Service Provider to access the system through the Web Server (410), where the Individual Service Provider may input additional personal information, including preferred user identification and password data, qualifications and experiences, and automated payment information. On submission of this data, the web engine transmits it to the Service Provider Record Engine, which transfers it for storage to the Service Provider Record for the Individual Service Provider. The Individual Service Provider may then input custom schedule preferences (411), custom information about the services offered (412), and information about each Consumer who is a client of the Individual Service Provider (413), all of which data on submission is transferred to the Service Provider Record Engine, which stores it as part of the Service Provider Record for the Individual Service Provider. On submission, the system will verify the completeness if the information and will offer the Individual Service Provider the option to activate the system for use by consumers and Company Service Providers connected with the Individual Service Provider (414). When activation is selected, the Individual Service Provider next has the options of using the system tools (401), searching for system data (402), changing his or her account further (403), or logging off the system (900).

If the system determines that the log-in information submitted in step (160) is for an activated account (400), the system directs the Individual Service Provider to a system option Template for Individual Service Providers where the Individual Service Provider may choose to use the system tools (401), search for system data (402), change his or her account further (403), or log off the system (900). If any one of these options is selected, the system will display the corresponding templates and forms (420, 430, and 440). Examples of these templates and forms are illustrated in FIGS. 10 to 20. In each instance, when the Individual Service Provider has finished using the option selected, the system will return the Individual Service Provider to the system option template where the Individual Service Provider may select another option or log off (900).

Figures 10, 11:
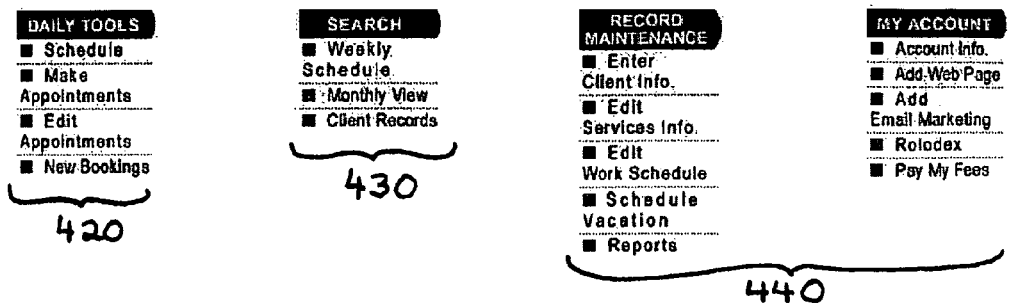
FIG. 10 is an illustration of one embodiment of the System Option Template presented to Individual Service Providers as part of the method described in FIG. 9.
FIG. 11 is an illustration of one embodiment of the Daily Schedule Review Template.

FIG. 10 illustrates one embodiment of the System Option Template for Individual Service Providers. This page is displayed at Step 401 in FIG. 8 when an Individual Service Provider has logged on to the system subsequent to the initial log-on. The Individual Service Provider may select any of the options shown, as described in FIG. 9. For example, the Individual Service Provider may choose from among the system tools (420) to review his or her schedule, make or edit appointments, or enter information about a Consumer who has scheduled for the first time "new booking". To find data stored in the system previously, the Individual Service Provider may search the Appointment Records or Consumer Records (430). Custom preferences for services, schedules, reports, automatic payment, mailing lists, and web page and email options may be edited through record and account maintenance (440). The Individual Service Provider may make a selection by means of a hyperlink, button, or other indicator (450) or may log off of the system (900).

Referring to FIG. 11, one embodiment is illustrated of a Daily Schedule Review Template generated by the Appointment Engine to display the daily schedule of an Individual Service Provider. To display this Daily Schedule Form, the Individual Service Provider selects the Schedule hyperlink shown in FIG. 10 for the Daily Tools (420). That selection transmits an input to the web engine on the Web Server, which in turn transmits the input to the Appointment Engine on the Database Server. The Appointment Engine accesses the Service Provider Record for the Individual Service Provider to find all custom preferences that have previously been stored for the Daily Schedule Review Template and also searches the Appointment Records for all records with corresponding identifiers for the day. It then generates the Daily Schedule, displaying data from the Appointment Records and from the Consumer Records for the Consumer's name and other identifying information, such as telephone number, as selected by the custom preferences stored by the Individual Service Provider. Each entry displayed in the Daily Schedule Review Template is a hyperlink, allowing the Individual Service Provider to select a particular Consumer and review the Consumer Record for previously stored details about the Consumer and past services.

The Daily Schedule Form will display all Appointment Records for the day selected, regardless of whether made by the Individual Service Provider, an authorized Company Service Provider, or the Consumer. In one embodiment of the present invention, Consumers may select to be placed on a waiting list for a preferred appointment time not otherwise available. For any Consumers who have made this selection, the Appointment Engine will display as hyperlinks on the Daily Schedule Review Template all the names of Consumers who have selected waiting list status for the day shown. The waiting list function is offered to any Consumer who prefers an appointment time that has previously been reserved, as described in detail in FIG. 6.

Referring to FIG. 12, one embodiment is illustrated of a form generated by the Appointment Engine to display the weekly schedule of an Individual Service Provider. To display this Weekly Schedule Form, the Individual Service Provider selects the Weekly Schedule hyperlink shown in FIG. 10 for the Search Tools (430). That selection transmits an input to the web engine on the Web Server, which in turn transmits the input to the Appointment Engine on the Database Server. The Appointment Engine accesses the Service Provider Record for the Individual Service Provider to find all custom preferences that have previously been stored for the Weekly Schedule Review Template and also searches the Appointment Records for all records with corresponding identifiers for the Week. It then generates the Weekly Schedule Review Template, displaying data from the Appointment Records and from the Consumer Records. Each entry displayed is a hyperlink, allowing the Individual Service Provider to select a particular Consumer and review the Consumer Record for previously stored details about the Consumer and past services.

FIG. 13 illustrates one embodiment of a form generated by the Appointment Engine to display the monthly schedule of an Individual Service Provider. To display this Monthly Schedule Review Template, the Individual Service Provider selects the Monthly Schedule hyperlink shown in FIG. 10 for the Search Tools (430). That selection transmits an input to the web engine on the Web Server, which in turn transmits the input to the Appointment Engine on the Database Server. The Appointment Engine accesses the Service Provider Record for the Individual Service Provider to find all custom preferences that have previously been stored for the Monthly Schedule Review Template and also searches the Appointment Records for all records with corresponding identifiers for the Month. It then generates the Monthly Schedule Review Template. This Template shows one month at a time with an indication of the schedule for each day. Each day is a hyperlink that may be selected to review the Daily schedule Review Template for that particular day. The Individual Service Provider may change the month viewed by selecting any of the months appearing at the right side panel. In the side panel, any dates that have appointments scheduled will be highlighted hyperlinks that can be selected to review the Daily Schedule Review Template for that particular day.

Referring to FIG. 14, one embodiment of a Consumer Record Review Template is illustrated. For any particular Consumer, the Consumer Record can be accessed only by the Individual Service Provider who provides services to that particular Consumer. To review a Consumer Record, the Individual Service Provider makes a selection through system Option Template selection page as illustrated in FIG. 10 or selects a hyperlink in a Daily or Weekly Schedule Review Template as illustrated in FIGS. 11 and 12. The Individual Service Provider's selection is received by the web engine on the Web Server, which transmits it to the Consumer Record Database, where the Consumer Engine generates the Consumer Record Review Template using the data stored for the Consumer Record selected. This information may include name, address, and communication information for the Consumer, important personal dates, future appointments, and service history.

In FIG. 15, one embodiment of a Consumer Profile Survey Template is shown for the present invention. This Template is generated by the web engine whenever an Individual Service Provider selects to enter a new Consumer Record on the System Options Template as illustrated in FIG. 10. It includes separate fields or dialog boxes for data entry by the Consumer. Such fields may include fields or dialog boxes for textual content typed in any format or in limited format, such as pre-determined formats for telephone numbers. They may also include fields containing pre-generated options selectable by the Individual Service Provider, selectable or manipulatable icons, buttons, links, highlightable data, or other selectable data pre-generated by the system and presented to the Individual Service Provider. For example, FIG. 15 illustrates fields having selectable data pre-generated for months and days.

Referring to FIG. 16, one embodiment is illustrated of the custom preferences selected by an Individual Service Provider for his or her weekly schedule. The weekly Schedule Options Template in this embodiment shows the work hours and break hours selected for each day of the week and also indicates the days off selected. To edit any of the preference data stored for a particular day, the Individual Service Provider selects a button or highlightable link for that particular day.

Referring to FIG. 17, one embodiment is illustrated of the Day Schedule Survey Template that may be generated by the web engine and displayed to the Individual Service Provider for purposes of entering custom preferences for a particular day of the week. The fields on this Template contain pre-generated options selectable by the Individual Service Provider for inputting start and end times, break times, and day off preferences. When the Individual Service Provider has made the selections desired, he or she may select the submission indicator to transmit them to the web engine on the Web Server, which in turn transmits the data to the Service Provider Record stored in the Service Provider Database for the Individual Service Provider.

FIG. 18 illustrates one embodiment of a Search Option Template that may be generated by the web engine and displayed to the Individual Service Provider for purposes of editing appointments stored in the Appointment Records. By means of this Template, the Individual Service Provider can search by one of three procedures for the appointments to be edited. By the first search procedure (410), the Individual Service Provider may enter the first and/or last name of a Consumer and select the search indicator. The se and search procedure (402) allows the Individual Service Provider to search for a Consumer based on the initial of the Consumer's last name. The third search procedure (403) may be used to locate appointments by month and day. When the Individual Service Provider submits a search indicator to the web engine on the Web Server, the web engine will transmit it to the Consumer Engine or Appointment Engine, respectively, which Engine will compare the input indicator with the identifiers of the stored data and will retrieve the matching data for display to the Individual Service Provider.

Referring to FIG. 19, one embodiment is illustrated of a Service Survey Template used by an Individual Service Provider to change data related to a service offered by the Individual Service Provider. When an Individual Service Provider first logs into the system as shown in FIG. 10, the Individual Service Provider will enter the services that are offered and information about those services. At any subsequent time, the Individual Service Provider may access the data related to services offered through the record maintenance option of the System Option Template as described in FIG. 10. In this option, the Individual Service Provider may select to edit services information, and on receipt of that selection input, the web engine will display a Template similar to the one shown in this Figure. Any data previously saved for the service offered will be retrieved through the Service Provider Record Engine and will be filled out in the fields on this form. The Service Provider may then make new choices and add textual information into the fields as desired. When finished, the Individual Service Provider selects the submission indicator, and the web engine then transmits the data to the Service Provider Database for storage in the Service Provider Record for the Individual Service Provider.

In FIG. 20, one embodiment of a Report is illustrated. A plurality of Reports may be generated by the system at the request of the Individual Service Provider. The Individual Service Provider makes such a request through the System Option Template as illustrated in FIG. 10. Such Reports may include a list of all Consumer contact information for the Individual Service Provider, a listing of future appointments, and mailing labels for the Consumer connected with the Individual Service Provider. The Report illustrated in FIG. 20 is for income tracking, and it is generated by the database engines of the system from data stored in the Service Provider Record for the Individual Service Provider and the Appointment Records identified within a specific data range.

While this invention has been described in connection with a preferred embodiment or embodiments, it is not intended to limit the scope of the invention to the particular form set forth, but on the contrary, it is intended to cover such alternatives, modifications, and equivalents as may be included within the spirit and scope of the invention as defined by the appended claims.

I claim:

1. A system for automated coordination of appointment time schedules using a network, the system comprising:

a web engine associated with a web server operable to communicate with the network and to present a user-type survey form to a client of the network, said web engine further operable to receive from said client user-type identifiers that are selected and entered by said client using said form, and further operable to allow or limit said client's access to the system based on said user-type identifiers received;

an appointment web engine associated with the web server operable to communicate with the network and to present an appointment survey form to said client of the network, said appointment web engine further operable to receive from said client appointment data that is entered in said form;

a provider web engine associated with the web server operable to communicate with the network and to present a plurality of versions of provider profile and preference survey forms to said client of the network, each form having user-type content specific to said client determined as a type of user by said user-type identifiers received by said web engine, said provider web engine further operable to receive from said client provider profile and preference data entered in said forms;

a consumer web engine associated with the web server operable to communicate with the network and to present a consumer profile survey form to said client of the network, said provider web engine further operable to receive from said consumer profile data entered in said forms;

an appointment mapping engine in communication with said appointment web engine, the appointment mapping engine operable to receive appointment data from said appointment web engine and to generate at least one appointment identifier in response to parsing said appointment data, said appointment mapping engine further operable to index the at least one appointment identifier in response to the parsed appointment data, said at least one appointment identifier being linked to an appointment record, which appointment record stores said appointment data;

a provider mapping engine associated with a database server in communication with said provider web engine, said provider mapping engine operable to receive the provider profile data from said provider web engine and to generate at least one provider identifier in response to parsing said provider profile data, said provider mapping engine further operable to index the at least one provider identifier in response to said parsed provider profile data, the at least one provider identifier being linked to a provider record, which provider record stores said provider profile data;

a provider mapping engine associated with a database server in communication with said provider web engine, said provider mapping engine operable to receive the provider preference data from said provider web engine and to generate at least one provider identifier in response to parsing said provider preference data, said provider mapping engine further operable to index the at least one provider identifier in response to said parsed provider preference data, the at least one provider identifier being linked to a provider record, which provider record stores said provider preference data; and a consumer mapping engine associated with a database server in communication with said consumer web engine, said consumer mapping engine operable to receive the consumer data from said consumer web engine and to generate at least one consumer identifier in response to parsing said consumer data, said consumer mapping engine further operable to index the at least one consumer identifier in response to said parsed consumer data, the at least one consumer identifier being linked to a consumer record, which consumer record stores said consumer data.

2. The system of claim 1, further comprising a filter engine in communication with said appointment, provider, and consumer web and mapping engines, the filter engine operable to control communication of said appointment, provider profile, provider preference, and consumer profile data between said web engines and mapping engines.

3. The system of claim 1, further comprising an appointment index having categories corresponding to said appointment data, said appointment mapping engine being operable to index the at least one appointment identifier by assigning the at least one appointment identifier to one of the appointment index categories in response to comparing the appointment data corresponding to the one category to said parsed appointment data.

4. The system of claim 3, wherein the appointment survey form includes at least one selectable input field, each selectable input corresponding to the appointment data of a category in said appointment index.

5. The system of claim 1, further comprising a provider index having categories corresponding to said provider profile data, said provider mapping engine being operable to index the at least one provider identifier by assigning the at least one provider identifier to one of the provider profile index categories in response to comparing the provider profile data corresponding to the one category to the parsed provider profile data.

6. The system of claim 5, further comprising a provider index having categories corresponding to said provider preference data, said provider mapping engine being operable to index the at least one provider identifier by assigning the at least one provider identifier to one of the provider preference data index categories in response to comparing the provider preference data corresponding to the one category to the parsed provider preference data.

7. The system of claim 6, wherein the provider and preference survey forms include at least one selectable input field, each selectable input corresponding to the provider and preference data of a category in the provider index.

8. The system of claim 1, further comprising a consumer index having categories corresponding to said consumer profile data, said consumer mapping engine being operable to index the at least one consumer identifier by assigning the at least one consumer identifier to one of the consumer index categories in response to comparing said consumer profile data corresponding to the one category to the parsed consumer profile data.

9. The system of claim 8, wherein said consumer profile survey form includes at least one selectable input field, each selectable input corresponding to the consumer profile data of a category in said consumer index.

10. The system of claim 1, wherein said appointment web engine includes an appointment review form, and wherein said appointment web engine is operable to:
    map appointment data from fields in said appointment survey form to fields in said appointment review form;
    communicate said appointment review form to a client of the network; and
    modify appointment data in said fields of the appointment survey form in response to receipt of modifications from the client to said fields of said appointment review form.

11. The system of claim 1, wherein said provider web engine includes a plurality of versions of provider profile and preference review forms, and wherein said provider web engine is operable to:
    map provider profile data from fields in said plurality of versions of said provider profile forms to fields in said plurality of versions of said provider profile review forms;
    map provider preference data from fields in said plurality of versions of said preferences survey forms to fields in said plurality of versions of said provider preference review forms;
    communicate one of said plurality of versions of said provider profile review forms to a client of said network in response to identification data received from said client to determine a selected one of the plurality of versions of said forms, each version displaying different fields of information associated with said provider record;
    communicate one of said plurality of versions of said provider preference review forms to a client of said network in response to identification data received from said client to determine a selected one of the plurality of versions of said forms, each version displaying different fields of information associated with said provider record;
    modify provider profile data entered in fields of one of said plurality of versions of said provider profile forms in response to receiving modifications from said client to said fields of one of said plurality of versions of the provider profile review forms selected by the client; and
    modify provider preference data entered in fields of one of said plurality of versions of said provider preference forms in response to receiving modifications from said client to said fields of one of said plurality of versions of the provider preference review forms selected by the client.

12. The system of claim 1, wherein said consumer web engine includes a consumer review form, and wherein said consumer web engine is operable to:
    map consumer profile data from fields in said consumer profile survey form to fields in said consumer profile review form;
    communicate said consumer profile review form to a client of the network; and modify consumer profile data in fields of said consumer profile form in response to receipt of modifications from the client to fields of said consumer profile review form.

13. The system of claim 1, wherein said appointment mapping engine further includes an appointment modification form, and wherein said appointment mapping engine is operable to:
- map appointment data from said appointment record to fields in said appointment modification form;
- communicate said appointment modification form to a client of the network; and
- modify appointment data in said appointment record in response to receipt of modifications to fields of said appointment modification form.

14. The system of claim 1, wherein said provider mapping engine further includes a plurality of versions of provider profile and preference modification forms, and wherein said provider mapping engine is operable to:
- determine a selected one of the plurality of versions of said forms in response to receipt of identification data from the client;
- map provider profile data from the provider record to fields in the selected provider profile modification form;
- map provider preference data from the provider record to fields in the selected provider preference modification form;
- communicate said selected provider profile modification form to a client of the network;
- communicate said selected provider preference modification form to a client of the network;
- modify provider profile data in said provider record in response to receiving modifications to fields of said selected provider profile modification form; and
- modify provider preference data in said provider record in response to receipt of modifications to fields of said selected provider preference modification form.

15. The system of claim 1, wherein said consumer mapping engine further includes a consumer profile modification form, and wherein said consumer mapping engine is operable to:
- map consumer profile data from said consumer record to fields in said consumer profile modification form; and
- communicate said consumer profile modification form to a client of the network; and
- modify consumer, profile data in said consumer record in response to receipt of modifications to fields of said consumer profile modification form.

16. The system of claim 1, further comprising a provider profile web engine and mapping engine separate from a provider preference web engine and mapping engine.

17. The system of claim 1, wherein said appointment, profile, and consumer web engines include a plurality of versions of search forms, and wherein the mapping engines are further operable to:
- receive from a client appointment, provider, and consumer search criteria input by the client;
- compare the search criteria to the appointment, provider, and consumer data associated with the categories of the appointment, provider, and consumer indices;
- select each identifier assigned to the categories in response to comparing the search criteria; and
- display to the client the data of each record for each selected identifier.

18. The system of claim 1, wherein said appointment web engine is capable of receiving a wait-list selection from a client of the network, such web engine further operable to receive the appointment and service preference data from said client and to transmit said preference data to the appointment mapping engine, which mapping engine is operable receive said preference data and to generate an appointment wait identifier in response to parsing said preference data, said appointment mapping engine further operable to index the appointment wait identifier in response to the parsed appointment data, said wait identifier being linked to an appointment record, which record stores the appointment and service preference data, said appointment mapping engine further operable to compare modified appointment data with the indexed appointment wait identifiers and to notify automatically said client of the network by electronic message in the event of a match, said electronic message informing said client that an appointment has become available at the selected preferred time.

19. The system of claim 1, further comprising standard messages, said standard messages being selectable and customizable by a provider, and capable of being transmitted by said provider to a consumer.

20. The system of claim 19, wherein said messages are selected from a group comprised of electronic marketing letters, informational letters, informational notices, and newsletters.

21. The system of claim 1, further comprising standard display forms for provider information, said forms being selectable and customizable by a provider and capable of being reviewed by a client of the network.

22. The system of claim 21, wherein said display forms are used to display information in web page formats, said information being selected from a group comprised of available services, available products, provider qualifications, business location, and marketing information.

23. The system of claim 1, further comprising standard reports, said reports capable of being generated by the mapping engines from data stored in provider, appointment, and consumer records, and further capable of being printed or reviewed by a client of the network.

24. The system of claim 23, wherein said reports are selected from a group comprised of address labels, customer lists, income statements, and appointment schedules.

25. The system of claim 1, further comprising:
- a provider member registrant web engine operable to communicate with the network and to present a provider member registrant form to a client of the network, said web engine further operable to receive from the client provider member registration data that is entered in said form and to transmit said data to the provider mapping engine;
- a consumer member registrant web engine operable to communicate with the network and to present a consumer member registrant form to a client of the network, said web engine further operable to receive from the client consumer member registration data that is entered in said form and to transmit said data to the consumer mapping engine;
- the provider mapping engine in communication with said provider member registrant web engine, the provider mapping engine operable to receive the provider member registration data from said provider member registrant web engine and to generate at least one provider member identifier in response to parsing the provider member registration data, the provider mapping engine further operable to index said at least one provider member identifier in response to the parsed provider member registration data, the at least one provider member identifier being linked to the provider record that stores the provider profile and preference data;

the consumer mapping engine in communication with said consumer member registrant web engine, said consumer mapping engine operable to receive the consumer member registration data from said consumer member registrant web engine and to generate at least one consumer member identifier in response to parsing said consumer member registration data, the consumer mapping engine further operable to index the at least one consumer member identifier in response to said parsed consumer member registration data, the at least one consumer member identifier being linked to the consumer record that stores the consumer profile data.

26. The system of claim 25, further comprising a filter engine in communication with the provider and consumer member registrant web engines and the provider and consumer mapping engines, said filter engine operable to control communication of provider and consumer member registration data between said provider and consumer member registrant web engines and said provider and consumer mapping engines.

27. The system of claim 25, further comprising a provider member index having categories corresponding to said provider member registration data, said provider mapping engine being operable to index the at least one provider member identifier by assigning the at least one provider member identifier to one of said provider member index categories in response to comparing the provider member data corresponding to the one category to the parsed provider member registration data.

28. The system of claim 27, wherein the provider member registrant form includes at least one selectable input field, each selectable input corresponding to the provider member registration data of a category in the provider index.

29. The system of claim 25, further comprising a consumer member index having categories corresponding to said consumer member registration data said consumer mapping engine being operable to index the at least one consumer member identifier by assigning the at least one consumer member identifier to one of said consumer member index categories in response to comparing the consumer member data corresponding to the one category to the parsed consumer member registration data.

30. The system of claim 29, wherein the consumer member registrant form includes at least one selectable input field, each selectable input corresponding to the consumer member registration data of a category in the consumer index.

31. The system of claim 25, wherein said provider web engine includes a provider membership review form, and wherein said provider web engine is operable to:

map provider member registration data from fields in said provider member registrant form to fields in said provider membership review form;

communicate said provider membership review form to a client of the network; and modify provider member registration data in fields of said provider membership registrant form in response to receipt of modifications from the client to fields of said provider membership review form.

32. The system of claim 25, wherein said consumer web engine includes a consumer membership review form, and wherein said consumer web engine is operable to:

map consumer member registration data from fields in said consumer member registrant form to fields in said consumer membership review form;

communicate said consumer membership review form to a client of the network; and modify consumer member registration data in fields of said consumer membership registrant form in, response to receipt of modifications from the client to fields of said consumer membership review form.

33. The system of claim 25, wherein said provider mapping engine further includes a provider member registration modification form, and wherein said provider mapping engine is operable to:

map provider member registration data from said provider record to fields in said provider member registration modification form;

communicate said provider member registration modification form to a client of the network; and modify provider member registration data in said provider record in response to receipt of modifications to fields of said provider member registration modification form.

34. The system of claim 25, wherein said consumer mapping engine further includes a consumer member registration modification form, and wherein said consumer mapping engine is operable to:

map consumer member registration data from said consumer record to fields in said consumer member registration modification form;

communicate said consumer member registration modification form to a client of the network; and modify consumer member registration data in said consumer record in response to receipt of modifications to fields of said consumer member registration modification form.

* * * * *